(12) United States Patent
Sakaji et al.

(10) Patent No.: US 7,510,336 B2
(45) Date of Patent: Mar. 31, 2009

(54) PLUG-SOCKET CONNECTOR APPARATUS FOR OPTICAL FIBER TERMINATION

(75) Inventors: Takako Sakaji, Tsu (JP); Yutaka Abe, Taki-gun (JP); Shunsuke Hashimoto, Tsu (JP)

(73) Assignee: Matsushita Electric Works, Ltd., Kadoma-shi (JP)

( * ) Notice: Subject to any disclaimer, the term of this patent is extended or adjusted under 35 U.S.C. 154(b) by 0 days.

(21) Appl. No.: 11/905,245

(22) Filed: Sep. 28, 2007

(65) Prior Publication Data

US 2008/0260334 A1  Oct. 23, 2008

(30) Foreign Application Priority Data

Oct. 2, 2006  (JP) .............................. 2006-271142

(51) Int. Cl.
G02B 6/42 (2006.01)
G02B 6/43 (2006.01)
(52) U.S. Cl. .............................. 385/88; 385/89; 385/90
(58) Field of Classification Search ........................ None
See application file for complete search history.

(56) References Cited

U.S. PATENT DOCUMENTS

| 5,432,340 A | 7/1995 | Shibata et al. |
| 2006/0093281 A1 | 5/2006 | Kesler |

FOREIGN PATENT DOCUMENTS

| EP | 1067634 | 1/2001 |
| GB | 2143651 | 2/1985 |
| JP | 63-35844 | 11/1981 |
| JP | 02-064508 | 3/1990 |
| JP | 02-090134 | 3/1990 |
| JP | 07-117628 | 2/1994 |
| JP | 11-214100 | 8/1999 |
| JP | 11-329637 | 11/1999 |
| JP | 2002-023017 | 1/2002 |
| JP | 2004-184869 | 7/2004 |
| JP | 2005-258017 | 9/2005 |
| JP | 2006-251014 | 9/2006 |

OTHER PUBLICATIONS

Notification of Reasons for Refusal mailed May 13, 2008, issued on the Japanese application No. 2006-271142 and its translation.
Notification of Reasons for Refusal mailed Aug. 19, 2008, issued on the Japanese application No. 2006-271142 and the translation thereof.

*Primary Examiner*—Omar Rojas
(74) *Attorney, Agent, or Firm*—Edwards Angell Palmer & Dodge LLP

(57) ABSTRACT

Plug-socket connector apparatus for optical fiber termination comprises first and second plugs and a socket. The first and second plugs are both single ferrule plugs. The socket is a molded interconnect device and a plug holder, and includes terminals located on the bottom face of the socket, first and second bores located at one side of the socket, and first and second retainers. The retainers retain latches formed in the plugs so as to prevent the plugs from falling out of the bores and to restrict rotation angles of the plugs around the axes within predetermined rotation angle ranges, when the plugs is plugged in the bores.

14 Claims, 16 Drawing Sheets

PLUG-SOCKET CONNECTOR APPARATUS FOR OPTICAL FIBER TERMINATION

TECHNICAL FIELD

The invention relates generally to an optical fiber connector and more particularly to plug-socket connector apparatus for optical fiber termination.

BACKGROUND ART

Japanese Patent Application Publication Number H11-329637 issued Nov. 30, 1999 discloses connection apparatus between printed circuit boards, which is formed of a transmission connector and a reception connector. The transmission connector is a molded interconnect device (MID) including a light emitting element, and is mounted on a first printed circuit board. The reception connector is an MID that includes a light receiving element facing the light emitting element, and is mounted on a second printed circuit board piled on the first printed circuit board. Since this apparatus transmits an optical signal through the light emitting element and light receiving element, contacts to be connected each other can be omitted. However, the apparatus is configured to be located between two printed circuit boards, and accordingly cannot be used for optical communication with external devices. In addition, print circuit boards cannot be placed side by side in a horizontal direction.

Japanese Patent Application Publication Number H11-214100 issued Aug. 6, 1999 discloses hybrid optical-electrical connector apparatus that is formed of a hybrid plug and a hybrid socket. The plug is formed of an upper and lower cases, and has an optical signal transmitter, an optical signal receiver and a power plug. The transmitter and receiver are connected to two optical fiber cables included in a hybrid cord, respectively. The power plug is connected to a power cord included in the hybrid cord. The socket is formed of case and cover that contain a print circuit board mounted with a light emitter, a light receiver, a power jack and an external connector. The light emitter is mounted on the front of the board to face the optical signal receiver of the plug connected to the socket. The light receiver is mounted on the front of the board to face the optical signal transmitter of the plug connected to the socket. The jack is mounted on the front of the board to be electrically connected with the power plug of the plug connected to the socket. The external connector is mounted on the back of the board to be electrically connected with a connecter from external. If plug-socket connector apparatus is formed based on this apparatus of plug-socket-socket coupling type, namely the external connector is omitted, optical communication with external devices becomes possible through the optical fiber cables (hybrid cord). In addition, print circuit boards can be placed side by side in a horizontal direction.

However, since the hybrid plug is connected to the hybrid socket in a vertical posture with respect to the print circuit board, thickness dimension of an electronic product equipped with the plug-socket connector apparatus becomes large. In addition, the hybrid plug is formed of the upper and lower cases, and accordingly the thickness dimension is further increased. Moreover, since the square shaped optical signal transmitter and optical signal receiver are plugged in two square shaped cavities of the hybrid socket, respectively, stress is put on the optical signal transmitter and optical signal receiver as well as the two cavities through the hybrid cord (optical fiber cables).

FIGS. 19A and 19B show a photoelectric conversion connector which has been proposed conventionally. This connector comprises a plug 900 connected with an optical fiber cable, an MID substrate 920 detachably connected with this plug 900, and a metal shell 930 to which the plug 900 and MID substrate 920 are attached. The plug 900 has a plug body 901 formed of a rectangular synthetic resin mold. The left and right sides of the facing surface (the front face) with the MID substrate 920 in the plug 900 are formed with a pair of fit projections 902 projecting to the MID substrate 920 side. The front faces of the fit projections 902 are formed with openings of one side of a through hole 903 piercing the plug body 901 in the front and back direction, respectively. Two optical fiber cables 910 are inserted into the through holes 903 from the back side and then and fixed. The facing surface with the plug 900 in the MID substrate 920 is formed with a pair of fit cavities 921 into which the pair of fit projections 902 are fit, respectively. An optical element (a light emitting element or a light receiving element) 922 is mounted on the facing part with the end face of the optical fiber cable held by the plug 900 in the bottom of each fit cavity 921. The metal shell 930 comprises a rectangular bottom plate part 931, three hold spring parts 932 and three hold spring parts 933. The plug 900 and MID substrate 920 are put on the bottom plate part 931. The three hold spring parts 932 project from the front edge and the front side of left and right edges in the bottom plate part 931 toward upside, respectively and hold the MID substrate 920. The three hold spring parts 933 project from the back edge and the back side of left and right edges in the bottom plate part 931 toward upside, respectively and hold the plug body 901.

When the plug 900 is connected to the MID substrate 920, the MID substrate 920 is inserted into the metal shell 930 from upside. Each hold spring part 932 is then latched to the MID substrate 920. Consequently, the MID substrate 920 is fixed to the metal shell 930, and a receptacle is obtained. The plug 900 is then inserted into the receptacle from upside. In the state that the fit projections 902 of the plug body 901 are fit into the fit cavities 921 of the MID substrate 920, each hold spring part 933 is latched to the plug body 901. Thereby, the plug 900 is connected to the receptacle, and the optical fiber cables 910 of the plug 900 face the optical elements 922 mounted on the MID substrate 920.

In this photoelectric conversion connector, the plug 900 is connected to the metal shell 930 fixing the MID substrate 920 form the vertical direction of the optical axes of the optical elements 922 mounted on the MID substrate 920. Because of this, there is an issue that positioning precision between the optical axes of the optical fiber cables 910 held by the plug 900 and the optical axes of the optical elements 922 is low, and also the position relationship of the optical axes changes when the optical fiber cables 910 held by the plug 900 receive stress, so that transmission loss increases. Also, the optical elements 922 are mounted on the facing surface with the plug 900 in the MID substrate 920, but there is another issue that influence of noise and so on increases in case that electrical separation between the optical elements is insufficient. In addition, as shown in FIG. 19B, in the state that the plug 900 is connected to the receptacle, the upside of attachment and detachment direction of the plug 900 in the connector is not shielded, and accordingly shield performance cannot be secured.

DISCLOSURE OF THE INVENTION

It is an object of the present invention to avoid increasing dimension of a product equipped with plug-socket connector apparatus of the invention and to absorb stress from an optical fiber cable while retaining the cable to prevent an optical axis of the optical fiber from deviating from an optical axis of an optical element.

Plug-socket connector apparatus for optical fiber termination of the present invention (hereinafter referred to as "first invention") comprises a plug, a socket and a photoelectric converter. The plug is fixed at one end of an optical fiber cable enclosing an optical fiber. The socket is configured to be mechanically connected with the plug. The socket also has a cavity of which bottom faces the end face of the optical fiber projected form the end of the optical fiber cable when mechanically connected with the plug. The photoelectric converter includes an optical element located on the bottom of the cavity, and is provided for the socket. The plug is a single ferrule plug and comprises a plug-base, a circular plug-tip and at least one latch. The plug-base has a hole into which the end of the optical fiber cable is inserted, and fixes the end inserted into the hole. The plug-tip has a pinhole into which the optical fiber projected from the end of the optical fiber cable is inserted. The at least one latch is formed on one part of the side face of the plug-tip. The socket further comprises terminals, a bore and a retainer. The terminals are located on the bottom face of the socket and are electrically connected with the converter. The terminals also are electrically connected with lands of a printed circuit board, respectively when the socket is mounted on the board. The bore is located at one side of the socket, and comes in contact with the remaining part of the side face of the plug-tip so that the plug can rotate around the pinhole when the plug is mechanically connected with the socket. When the plug-tip is plugged in the bore, the retainer retains said at least one latch so as to prevent the plug-tip from falling out of the bore and to restrict a rotation angle of the plug around the pinhole within a predetermined rotation angle range.

In this invention, the plug is a single ferrule plug, and accordingly, for example, upper and lower cases constituting a conventional plug can be omitted. Since the terminals are located on the bottom face of the socket and the bore is located at one side of the socket, it is possible to reduce dimension of a product equipped with the plug-socket connector apparatus of the invention in comparison with the plug-socket connector apparatus obtained from said hybrid optical-electrical connector apparatus. Moreover, since the plug can rotate within the predetermined rotation angle range around the pinhole, it is possible to absorb stress from the optical fiber cable while retaining the cable to prevent an optical axis of the optical fiber from deviating from the optical axis of the optical element. In addition, even if the plug rotates within the predetermined rotation angle range in response to stress from the cable, the plug rotates around the pinhole and therefore the optical axis of the optical fiber is constant. That is, since relative position relationship of the optical axis of the optical fiber cable with respect to the optical axis of the optical element does not change, precision of matching the optical axes can be improved in comparison with said photoelectric conversion connector.

Plug-socket connector apparatus for optical fiber termination of the present invention (hereinafter referred to as "second invention") comprises first and second plugs, a socket and first and second photoelectric converters. The first and second plugs are fixed at one ends of first and second optical fiber cables enclosing first and second optical fibers, respectively. The socket is configured to be mechanically connected with the first and second plugs. The socket also has first and second cavities of which bottoms face the end faces of the first and second optical fibers projected form the ends of the first and second optical fiber cables, respectively when mechanically connected with the first and second plugs. The first and second photoelectric converters include first and second optical elements located on the bottoms of the first and second cavities, respectively, and are provided for the socket. The first plug is a single ferrule plug and comprises a first plug-base, a first circular plug-tip and at least one latch formed on one part of the side face of the first circular plug-tip. The first plug-base has a first hole into which the end of the first optical fiber cable is inserted, and fixes the end inserted into the first hole. The second circular plug-tip has a second pinhole into which the first optical fiber projected from the end of the first optical fiber cable is inserted. The second plug is a single ferrule plug and comprises a second plug-base, a second circular plug-tip and at least one latch formed on one part of the side face of the second circular plug-tip. The second plug-base has a second hole into which the end of the second optical fiber cable is inserted, and fixes the end inserted into the second hole. The second circular plug-tip has a second pinhole into which the first optical fiber projected from the end of the second optical fiber cable is inserted. The socket further comprises terminals, first and second bores and first and second retainers. The terminals are located on the bottom face of the socket and are electrically connected with the first and second photoelectric converters. The terminals are also electrically connected with lands of a printed circuit board, respectively when the socket is mounted on the board. The first and second bores are located at one side of the socket. The first and second bores come in contact with the remaining parts of the side faces of the first and second circular plug-tips so that the first and second plugs can rotate around the first and second pinholes, respectively when the first and second plugs are mechanically connected with the socket. When the first and second circular plug-tips are plugged in the first and second bores, respectively, the first and second retainers retain the latches of the first and second circular plug-tips so as to prevent the first and second circular plug-tips from falling out of the first and second bores and to restrict rotation angles of the first and second plugs around the first and second pinholes within predetermined first and second rotation angle ranges. In this invention, it is possible to avoid increasing dimension of a product equipped with the plug-socket connector apparatus of the invention and to absorb stress from the optical fiber cables while retaining the cables to prevent optical axes of the optical fibers from deviating from the optical axes of the optical elements.

In an embodiment of the first invention, it further comprises a metal shell. The socket is formed of a molded interconnect device (MID) and a plug holder. The MID has the cavity, the photoelectric converter and the terminals. The holder has the bore and the retainer, and is fixed to the MID so that the bore is located in front of the cavity. The metal shell substantially covers the whole socket except at least a region of the terminals as well as the holder. In this embodiment, since the metal shell can substantially cover the whole MID except the region of the terminals, shield performance can be improved.

In an embodiment of the second invention, it further comprises a metal shell. The socket is formed of a molded interconnect device (MID) and a plug holder. The MID has the first and second cavities, the first and second photoelectric converters and the terminals. The plug holder has the first and second bores and the first and second retainers, and is fixed to the MID so that the first and second bores are located in front of the first and second cavities, respectively. The metal shell substantially covers the whole socket except at least a region of the terminals as well as the holder. In this embodiment, since the metal shell can substantially cover the whole MID except the region of the terminals, shield performance can be improved.

In an embodiment of the first invention, the plug has first and second latches as the at least one latch. The first and second latches stick out from opposite sides of the side face of the plug-tip. The bore comprises a circular bore corresponding to the plug-tip and first and second cuts respectively corresponding to the first and second latches. The retainer is formed of first and second arched hollows, and first and second lock ribs. The first and second arched hollows are located in the back of the plug holder, and are formed around an axis of the circular bore continuously from the backs of the first and second cuts, respectively. The first lock rib is formed on the circumferential face of the first arched hollow between one part including the first cut of the first arched hollow and the remaining part of the first arched hollow. The second lock rib is formed on the circumferential face of the second arched hollow between one part including the second cut of the second arched hollow and the remaining part of the second arched hollow. Each of the remaining parts of the first and second arched hollows corresponds to the predetermined rotation angle range. In this embodiment, for example, even if the plug rotates within the rotation angle range in response to stress from the cable, the plug rotates around the pinhole and therefore the optical axis of the optical fiber is constant.

In an embodiment of the second invention, the first plug has first and second latches as the at least one latch. The first and second latches stick out from opposite sides of the side face of the first circular plug-tip. The second plug has third and fourth latches as the at least one latch. The third and fourth latches stick out from opposite sides of the side face of the second circular plug-tip. The first bore comprises a first circular bore corresponding to the first circular plug-tip and first and second cuts respectively corresponding to the first and second latches. The second bore comprises a second circular bore corresponding to the second circular plug-tip and third and fourth cuts respectively corresponding to the third and fourth latches. The first retainer comprises first and second arched hollows, and first and second lock ribs. The first and second arched hollows are located in the back of the plug holder, and are formed around an axis of the first circular bore continuously from the backs of the first and second cuts, respectively. The first lock rib is formed on the circumferential face of the first arched hollow between one part including the first cut of the first arched hollow and the remaining part of the first arched hollow. The second lock rib is formed on the circumferential face of the second arched hollow between one part including the second cut of the second arched hollow and the remaining part of the second arched hollow. The second retainer comprises third and fourth arched hollows, and third and fourth lock ribs. The third and fourth arched hollows are located in the back of the plug holder, and are formed around an axis of the second circular bore continuously from the backs of the third and fourth cuts, respectively. The third lock rib is formed on the circumferential face of the third arched hollow between one part including the third cut of the third arched hollow and the remaining part of the third arched hollow. The fourth lock rib is formed on the circumferential face of the fourth arched hollow between one part including the fourth cut of the fourth arched hollow and the remaining part of the fourth arched hollow. Each of the remaining parts of the first and second arched hollows correspond to the first rotation angle range. Each of the remaining parts of the third and fourth arched hollows correspond to the second rotation angle range. In this embodiment, for example, even if the first and second plugs rotate within the first and second rotation angle ranges in response to stress from the cables, the first and second plug rotate around the first and second pinholes and therefore the optical axes of the first and second optical fibers are constant.

In an embodiment of the second invention, the plug holder is made of conductive material, and the metal shell has at least one spring piece that elastically contacts the plug holder. In this case, since the conductive holder is electrically connected with the metal shell, radiation noise caused by high speed transmission can be reduced and EMI can be improved. Moreover, it is possible to shield almost the whole socket except the region of the terminals as well as the first and second bores respectively corresponding to the first and second plugs.

In an embodiment of the second invention, each of the first and second plugs is made of conductive material. In this case, when the first and second plugs are plugged in the first and second bores, the first and second bores are also shielded with the first and second plugs and accordingly shield effect can be further enhanced.

In an example of the second invention, one and the other of the first and second optical elements are a light emitting element and a light receiving element, respectively. The MID has a shield pattern that is located between the first and second cavities and is electrically connected with the metal shell. The metal shell has a base intervening between the MID and the printed circuit board. The base is provided with an earth tab that is located right under the shield pattern and is soldered to a ground pattern of the printed circuit board. In this embodiment, since shield effect of the shield pattern can be enhanced, electrical separation between the light emitting element and the light receiving element can be performed certainly.

In an embodiment of the second invention, the top of the MID is formed with an earth pattern electrically connected with the shield pattern. The metal shell further has at least one spring piece that elastically contacts the earth pattern. In this case, the shield effect of the shield pattern can be further enhanced.

In an embodiment of the second invention, the plug holder further comprises first and second retaining holes outside the first and second bores, respectively. The MID further comprises first and second twin projections and first and second hollows. The first and second twin projections are respectively inserted into the first and second retaining holes to be retained. The first hollow is formed between the first twin projections, and the second hollow is formed between the second twin projections. The first and second hollows respectively form first and second gaps between the plug holder and the MID. The socket further comprises adhesive applied to each of the first and second hollows. In this embodiment, since quantity of the adhesive can be increased to enhance the adhesive strength, the MID and holder can be preferably fixed.

In an embodiment of the second invention, the plug holder further comprises a through hole formed between the first and second bores. The MID further comprises a hollow that is larger than the through hole and forms a slit gap between the plug holder and the MID around the abyss of the through hole. The socket further comprises adhesive applied to the hollow. In this embodiment, since adhesive area can be spread to enhance adhesive strength, the MID and holder can be preferably fixed.

In an embodiment of the second invention, the first and second arched hollows are formed around the axis of the first circular bore in opposite directions to each other continuously from the backs of the first and second cuts, respectively. In this case, for example, it is possible to prevent twist of each of the first and second optical fiber cables between a pair of the plug-socket connector apparatus. For example, when a pair of the sockets are mirror-arranged so that a pair of the holders face to each other, rotation directions at both ends of each of the first and second optical fiber cables between the holders agree between the holders.

In an embodiment of the second invention, the side faces of the first and second plug-bases are provided with first and second ribs for indicating rotation angles, respectively. The plug holder has first and second marks for representing rotation ranges of the first and second ribs, respectively. In this embodiment, since a rotation angle of each of the first and second plugs is understood, the connection working efficiency is improved.

BRIEF DESCRIPTION OF THE DRAWINGS

Preferred embodiments of the invention will now be described in further details. Other features and advantages of the present invention will become better understood with regard to the following detailed description and accompanying drawings where.

BEST MODE FOR CARRYING OUT THE INVENTION

Figure 1:
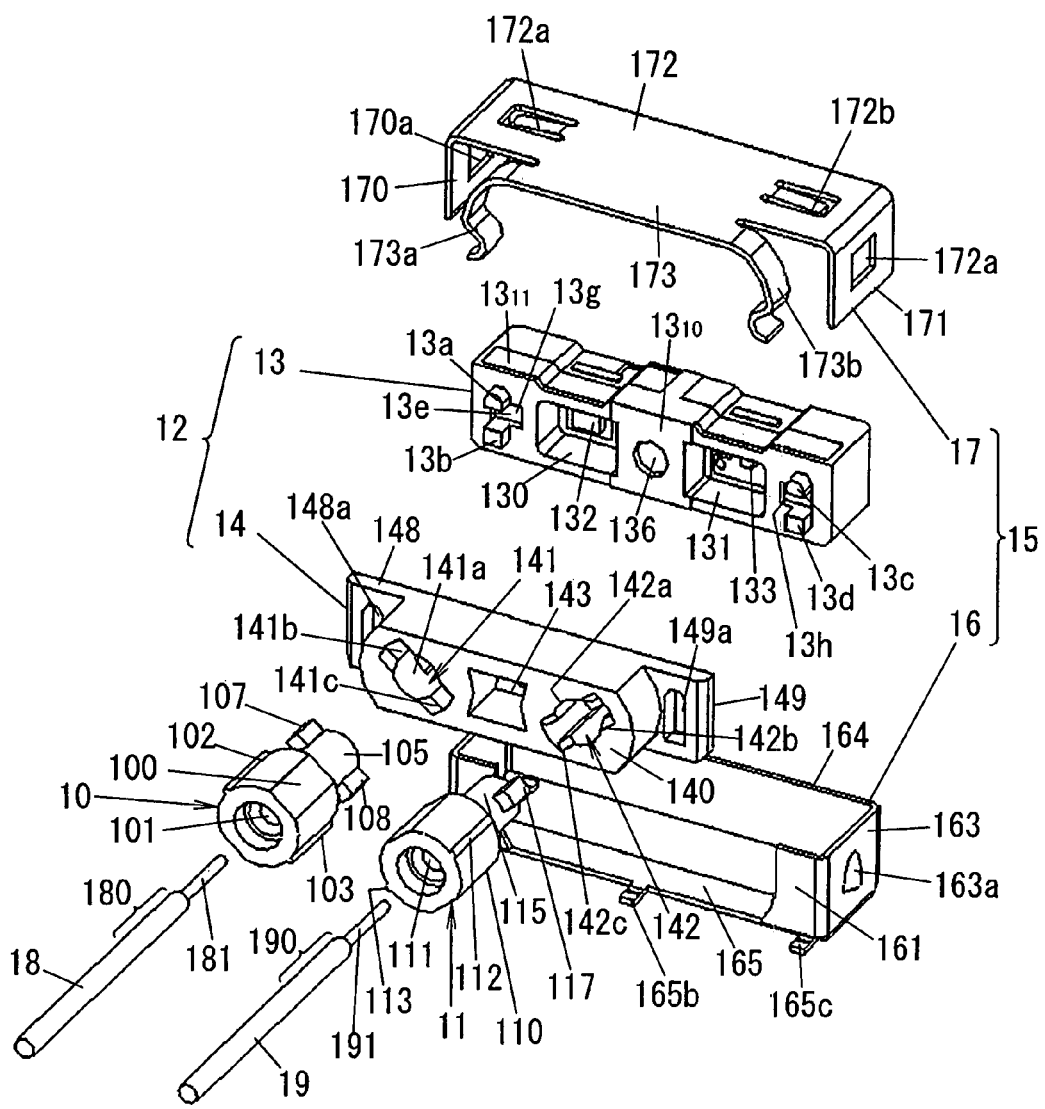
FIG. 1 is an exploded perspective view of plug-socket connector apparatus for optical fiber termination, in accordance with an embodiment of the present invention.
Figure 2A:
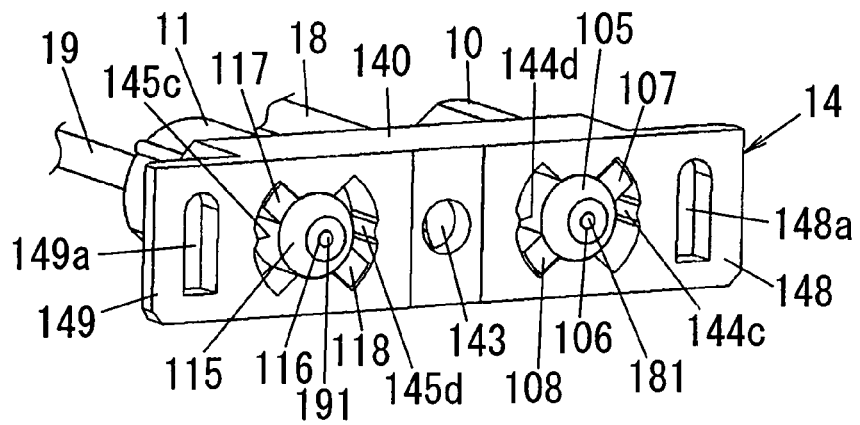
FIG. 2A is a perspective view of a plug holder when first and second plugs are inserted into first and second bores of the holder.
Figure 2B:
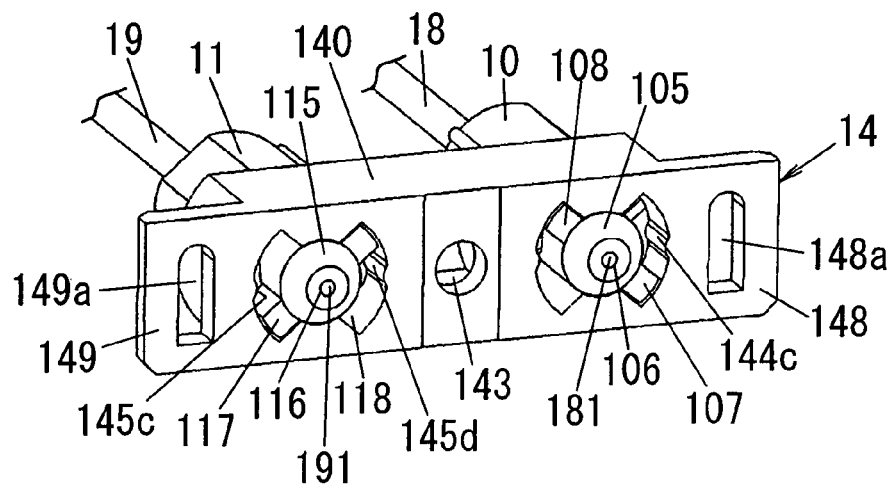
FIG. 2B is a perspective view of the holder when the first and second plugs are locked.
Figure 2C:
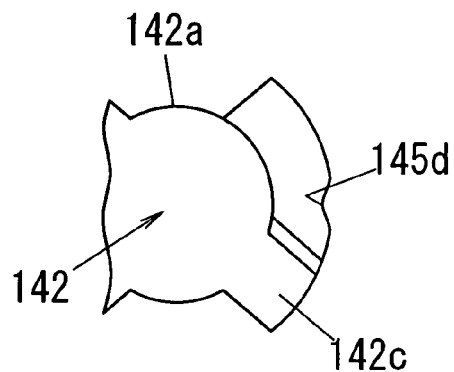
FIG. 2C is an enlarged view of part of the holder.

FIG. 1 shows plug-socket connector apparatus for optical fiber termination, in accordance with an embodiment of the present invention. This apparatus comprises first and second plugs 10 and 11, a socket 12, and a metal shell 15.

The first and second plugs 10 and 11 are fixed at one ends 180 and 190 of first and second optical fiber cables 18 and 19 enclosing first and second optical fibers 181 and 191, respectively. The plugs 10 and 11 are both single ferrule plugs and comprise first and second plug-bases 100 and 110 and first and second circular plug-tips 105 and 115, respectively. Each of the plugs 10 and 11 is also made of conductive material (e.g., conductive synthetic resin).

The first and second plug-bases 100 and 110 have first and second holes 101 and 111 into which the ends 180 and 190 of the cables 18 and 19 are inserted, respectively, and fixes the ends 180 and 190 inserted into the holes 101 and 111, respectively. For example, the ends 180 and 190 are respectively fixed to the holes 101 and 111 with adhesive. The side face of the plug-base 100 is provided with first ribs 102 and 103 for indicating the rotation angle of the plug 10, and the side face of the plug-base 110 is provided with second ribs 112 and 113 for indicating the rotation angle of the plug 11.

As shown in FIGS. 1, 2A, 2B and 3, the plug-tips 105 and 115 have first and second pinholes 106 and 116 into which the optical fibers 181 and 191 projected from the ends 180 and 190 of the cables 18 and 19 are inserted, respectively. In addition, the end face of the plug-tip 105 is formed with a hollow 105a larger than the pinhole 106. Similarly, the end face of the plug-tip 115 is formed with a hollow (not shown) larger than the pinhole 116. The plug 10 also comprises first and second latches 107 and 108 sticking out from opposite sides in the side face of the plug-tip 105. Similarly, the plug 11 comprises third and fourth latches 117 and 118 sticking out from opposite sides in the side face of the plug-tip 115. The positions of the ribs 102 and 103 correspond to those of the latches 107 and 108, respectively and the positions of the ribs 112 and 113 correspond to those of the latches 117 and 118, respectively.

Figure 3:
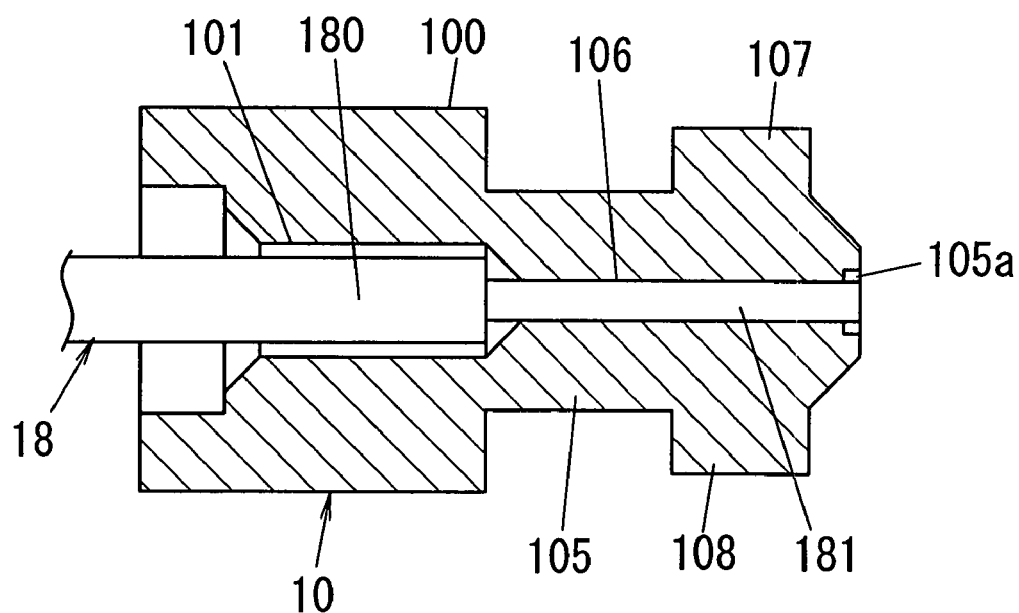
FIG. 3 is a sectional view of the first plug fixed at one end of a first optical fiber cable.

An example of fixing the plugs 10 and 11 to the cables 18 and 19 is explained with reference to FIG. 3. The optical fiber 181 projected from the end 180 of the cable 18 is adjusted to the length of the plug-tip 105 and then inserted from the hole 101 of the plug 10 to the pinhole 106. Afterwards, adhesive is injected into the pinhole 106 from the hole 101. At this time, surplus adhesive is shunted into the gap of the hollow 105a. Accordingly, it is possible to prevent the adhesive from attaching to the end face of the optical fiber 181 to fix the plug 10 to the cable 18. Similarly, the plug 11 is fixed to the cable 19.

Figure 4:
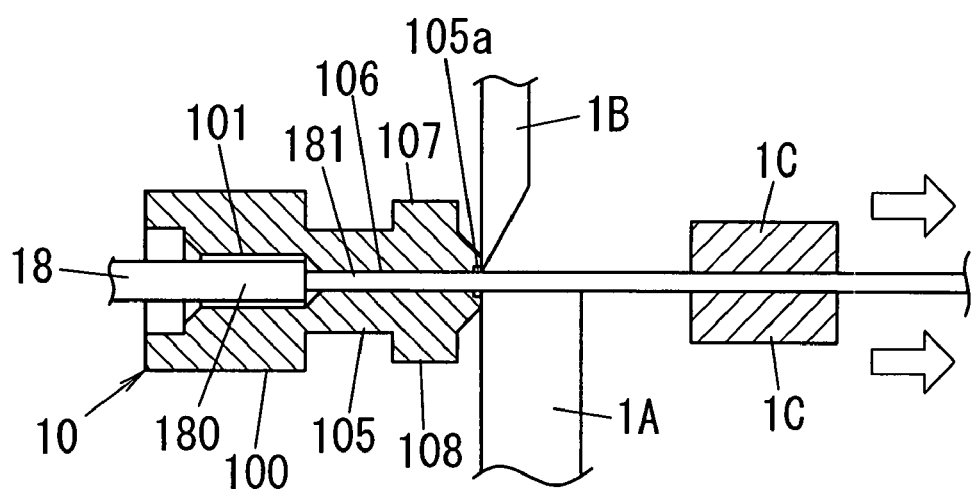
FIG. 4 is an explanatory diagram of length adjustment of a first optical fiber projected from the cable.
Figure 5:
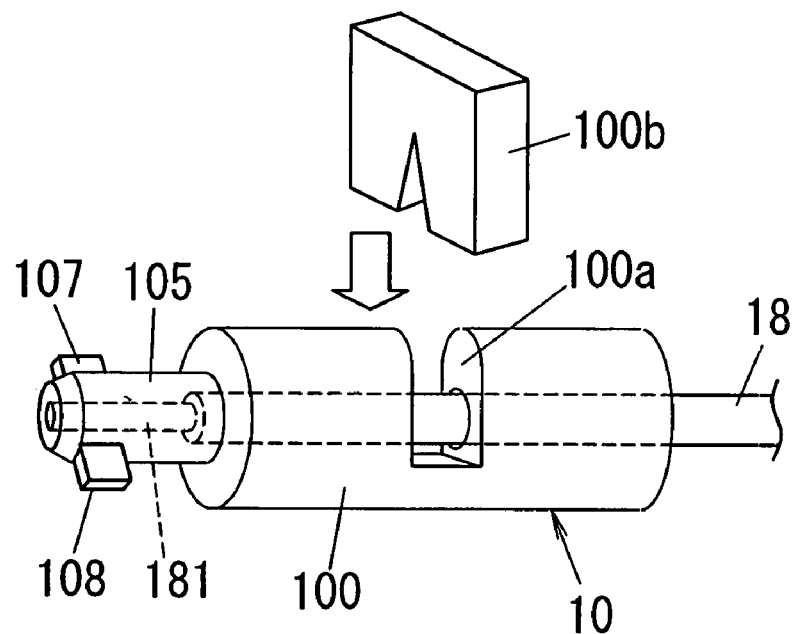
FIG. 5 illustrates an example of fix of the plug to the cable.
Figure 6:
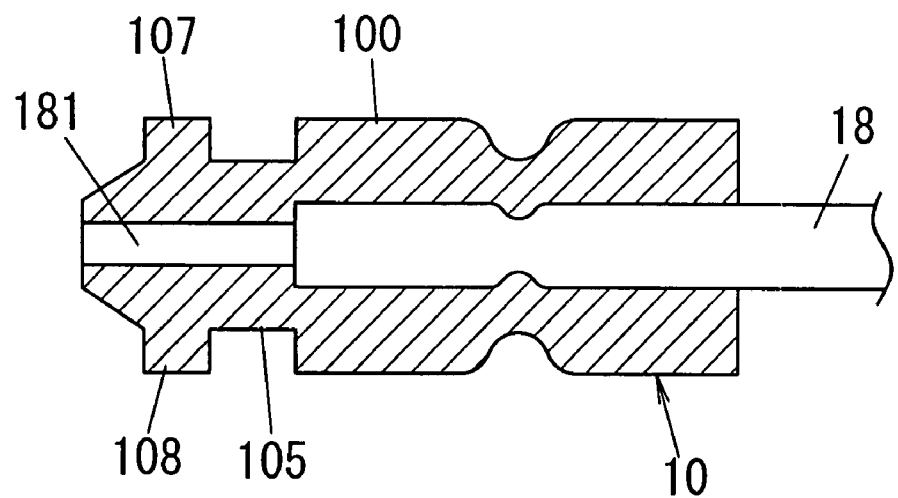
FIG. 6 illustrates an example of fix of the plug to the cable.
Figure 7A:
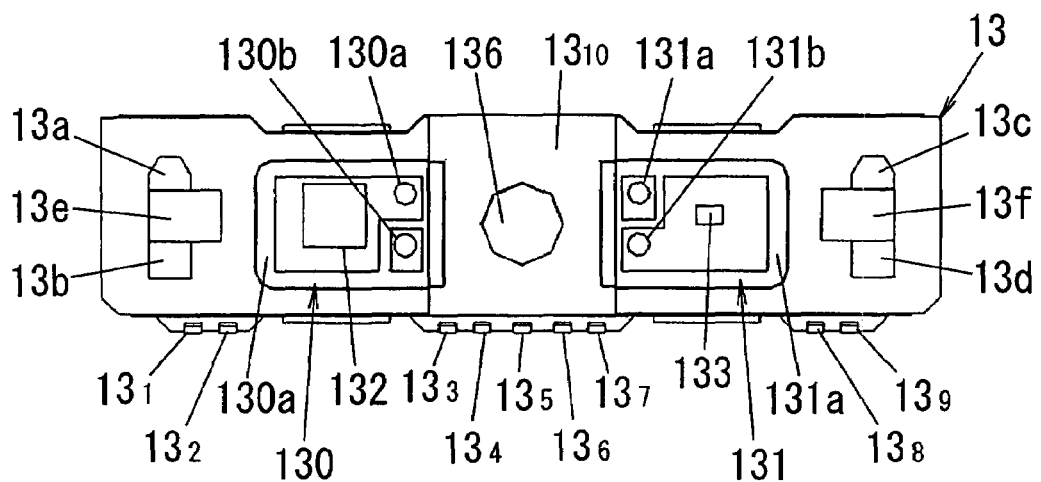
FIGS. 7A and 7B are front and back views of a socket of the plug-socket connector apparatus, respectively.
Figure 7B:
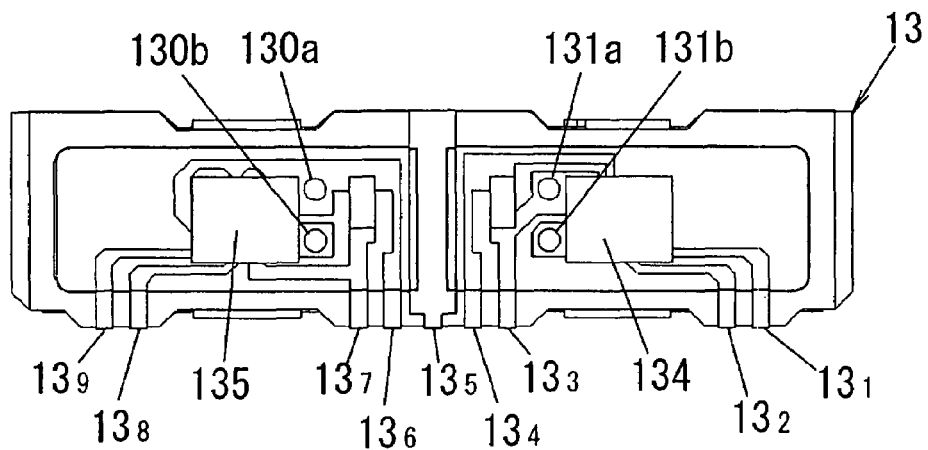
Figure 8A:
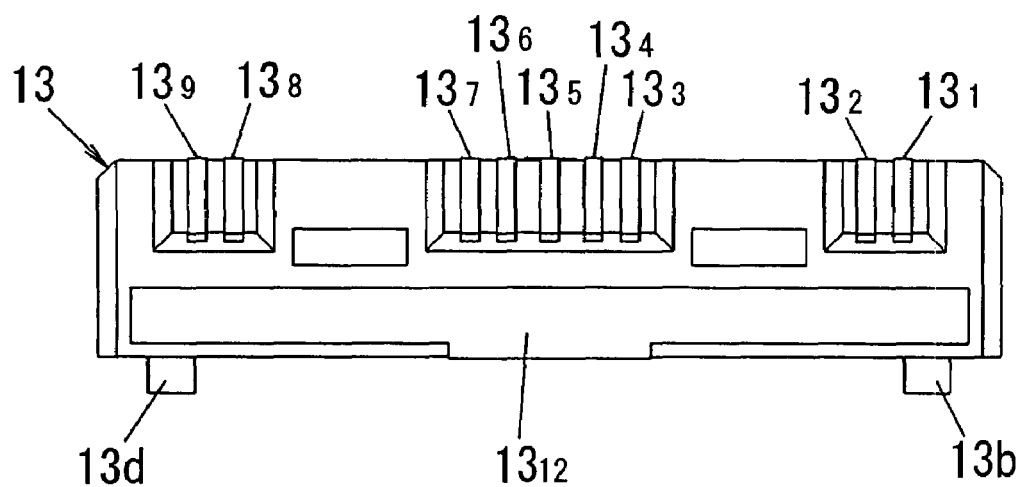
FIGS. 8A and 8B are bottom and right side views of an MID (molded interconnect device) of the socket, respectively.
Figure 8B:
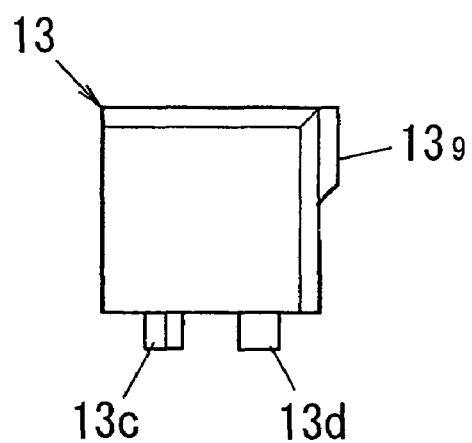

However, not limited to this, the optical fiber 181 projected from the end 180 of the cable 18 may be adjusted as shown in an example of FIG. 4. That is, the optical fiber 181 projected longer than the plug 10 is inserted from the hole 101 of the plug 10 to the pinhole 106. The optical fiber 181 projected from the plug-tip 105 is then cut along the end face of the plug-tip 105 with a backing block 1A and a diamond cutter 1B while being pulled through a pinch-jig 1C. At this point, the end face of the optical fiber 181 withdraws into the pinhole 106 of the plug-tip 105. Accordingly, fracture and dirt of the end face of the optical fiber 181 can be avoided. Similarly, the length of the optical fiber 191 of the cable 19 can be adjusted. In this case, though adhesive may be injected into the pinholes 106 and 116 from the holes 101 and 111 prior to cut of the optical fibers 181 and 191, the cables 18 and 19 can be also fixed as shown in examples of FIGS. 5 and 6. In the example of FIG. 5, the plug-base 100 is formed with a cut 100a and the cable 18 is fixed in the cut 100a with a wedge 100b pressed into the cut 100a. In the example of FIG. 6, the plug 10 is made of metal, and the cable 18 is fixed by tightening the circumference of the plug-base 100 of the plug 10.

The socket 12 is configured to be mechanically connected with the plugs 10 and 11. In the embodiment, the socket 12 is formed of an MID (molded interconnect device) 13 and a plug holder 14.

As shown in FIGS. 1, 7A, 7B, 8A and 8B, the MID 13 has first and second cavities 130 and 131, first and second optical elements 132 and 133, first and second ICs (integrated circuits) 134 and 135, terminals $13_1$-$13_9$, a shield pattern $13_{10}$, earth patterns $13_{11}$ and $13_{12}$, a hollow 136, first twin projections 13a and 13b, second twin projections 13c and 13d, and first and second hollows 13e and 13f. The terminals and patterns are formed through processes of: forming a thin film of copper on the surface of a substrate of the MID 13; forming patterns with leaser beam; removing unnecessary parts thorough etching; and electroplating in order of, for example, nickel and gold.

The first and second cavities 130 and 131 are located in the front side of the MID 13 that is in the shape of a quadratic prism. The bottoms 130a and 131a of the cavities 130 and 131 also faces the end faces of the fibers 181 and 191 projected from the ends 180 and 190 of the cables 18 and 19, respectively when the socket 12 is mechanically connected with the plugs 10 and 11.

The first optical element 132 and the first IC 134 constitute a first photoelectric converter, and the second optical element 133 and the second IC 135 constitute a second photoelectric converter. The elements 132 and 133 are mounted on the bottoms 130a and 131a of the cavities 130 and 131, respectively. In this case, the elements 132 and 133 are located on the bottoms 130a and 131a so that the optical axes of the elements 132 and 133 agree with the optical axes of the optical fibers 181 and 191, respectively. One and the other of the elements 132 and 133 are also a light emitting element and a light receiving element, respectively. In the embodiment, the elements 132 and 133 are the light receiving element (e.g., photodiode) and the light emitting element (e.g., light emitting diode), respectively. The element 132 has top and bottom electrodes, and the top electrode is electrically connected with the conductive pattern passing through a through hole 130b through a bonding wire. The bottom electrode is electrically connected with the conductive pattern passing through a through hole 130a. The element 133 also has top and bottom electrodes, and the top electrode of the element 133 is electrically connected with the conductive pattern passing through a through hole 131a through a bonding wire. The bottom electrode of the element 133 is electrically connected with the conductive pattern passing through a through hole 131b.

On the other hands, the ICs 134 and 135 are mounted in two hollows of the rear side of the MID 13, respectively. The IC 134 is electrically connected with the element 132 through the conductive patterns passing through the through holes 130a and 130b, and performs signal processing of an input signal from the element 132. The IC 135 is electrically connected with the element 133 through the conductive patterns passing through the through holes 131a and 131b, and performs signal processing for producing an output signal to the element 133. Since the region where the IC 134 is mounted is located at the back side of the conductive pattern where the element 132 is mounted and the conductive pattern is a pattern corresponding to at least the size of the IC 134. In other words, the pattern is formed in at least a region piled up in front and back direction of mount region of the corresponding IC 134. Consequently, the whole region in which the pattern is formed can equally receive the weight when the IC 134 is mounted on the MID 13, and therefore mounting of the IC 134 can be performed certainly. Similarly, since the region where the IC 135 is mounted is located at the back side of the conductive pattern where the element 133 is mounted and the conductive pattern is a pattern corresponding to at least size of the IC 135. That is, the pattern is formed in at least a region piled up in front and back direction of mount region of the corresponding IC 135. Consequently, the whole region in which the pattern is formed can equally receive the weight when the IC 135 is mounted on the MID 13, and therefore mounting of the IC 135 can be performed certainly.

The terminals $13_1$-$13_9$ are located on the bottom face of the MID 13 and are electrically connected with the first and second photoelectric converters, and are electrically connected with lands of a printed circuit board (not shown), respectively when the socket 12 is mounted on the board. The terminals $13_1$ and $13_2$ and the terminals $13_8$ and $13_9$ are located on the left and right base blocks of the bottom of the MID 13, respectively and the terminals $13_3$-$13_7$ are located on the center base block of the bottom. Height dimension of each of the base blocks is, for example, almost same as or slightly larger than the thickness dimension of the base of the metal shell 15. The terminals $13_1$-$13_9$ are also formed up to the slopes of the base blocks, and thereby back fillets can be formed and in consequence soldering strength can be enhanced. The IC 134 is electrically connected with the terminals $13_1$-$13_4$. The IC 135 is electrically connected with the terminals $13_6$-$13_9$.

The shield pattern $13_{10}$ is located on a partition wall between the cavities 130 and 131 and is electrically connected with the metal shell 15 to shield between the cavities 130 and 131, namely the light receiving side and the light emitting side. The earth patterns $13_{11}$ and $13_{12}$ are formed over the front-end parts of the top and bottom of the MID 13, respectively and are electrically connected with the pattern $13_{10}$. The patterns $13_{11}$ is also electrically connected with the terminal $13_5$ through a conductive pattern formed on the back side of the MID 13. The hollow 136 is located between the cavities 130 and 131. The first twin projections 13a and 13b and second twin projections 13c and 13d are formed at the both ends of the front side of the MID 13, respectively. The first hollow 13e is located between the projections 13a and 13b, and the second hollow 13f is located between the projections 13c and 13d.

As shown in FIGS. 1, 2A, 2B, 2C and 9B, the plug holder 14 has a body 140 formed with first and second bores 141 and 142, and a pair of flat face flanges 148 and 149 formed at the both ends of the body 140. This holder 14 is made of conductive material (e.g., conductive resin). In addition, the body 140 is provided with a through hole 143 (e.g., cavity and circular hole) and first and second retainers 144 and 145, and the flanges 148 and 149 are respectively formed with first and second retaining holes 148a and 149a.

This holder 14 is fixed to the MID 13 so that the bores 141 and 142 are arranged in front of the cavities 130 and 131, respectively. That is, the first twin projections 13a and 13b and the second twin projections 13c and 13d are respectively inserted into the holes 148a and 149a to be retained. In this case, the holder 14 is positioned and held to the MID 13 so that the bores 141 and 142 are arranged in front of the cavities 130 and 131, respectively. In addition, the first and second hollows 13e and 13f respectively forms first and second gaps 13g and 13h between the holder 14 and the MID 13, namely at parts between the first twin projections 13a and 13b and the second twin projections 13c and 13d. Thus, when the back face of the holder 14 is in contact with the front face of the MID 13, adhesive (not shown) is applied to each of the hollows 13e and 13f (gaps 13g and 13h). Afterwards, if the adhesive hardens, the MID 13 and holder 14 are fixed to each other through the adhesive. In such construction, since the adhesive strength can be increased by spreading area to which the adhesive is applied to increase quantity of the adhesive, the MID 13 and holder 14 can be preferably fixed. In short, the socket 12 further comprises the adhesive applied to each of the hollows 13e and 13f.

The first and second bores 141 and 142 are located in the front side of the body 140. The bore 141 comprises a first circular bore 141a corresponding to the first circular plug-tip 105 and first and second cuts 141b and 141c respectively corresponding to the first and second latches 107 and 108. Similarly, the bore 142 comprises a second circular bore 142a corresponding to the second circular plug-tip 115 and third and fourth cuts 142b and 142c respectively corresponding to the third and fourth latches 117 and 118.

Figure 10A:
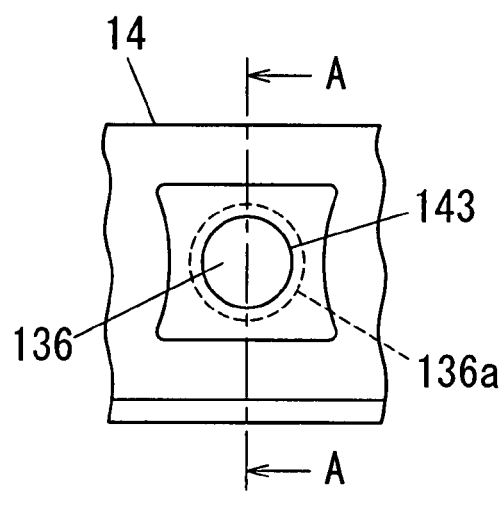
FIG. 10A is an enlarged sectional view of part of the socket.
Figure 10B:
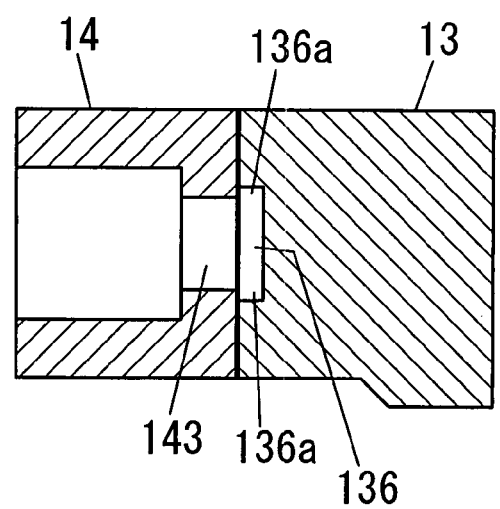
FIG. 10B is a sectional view along line A-A of FIG. 10A.
Figure 11:
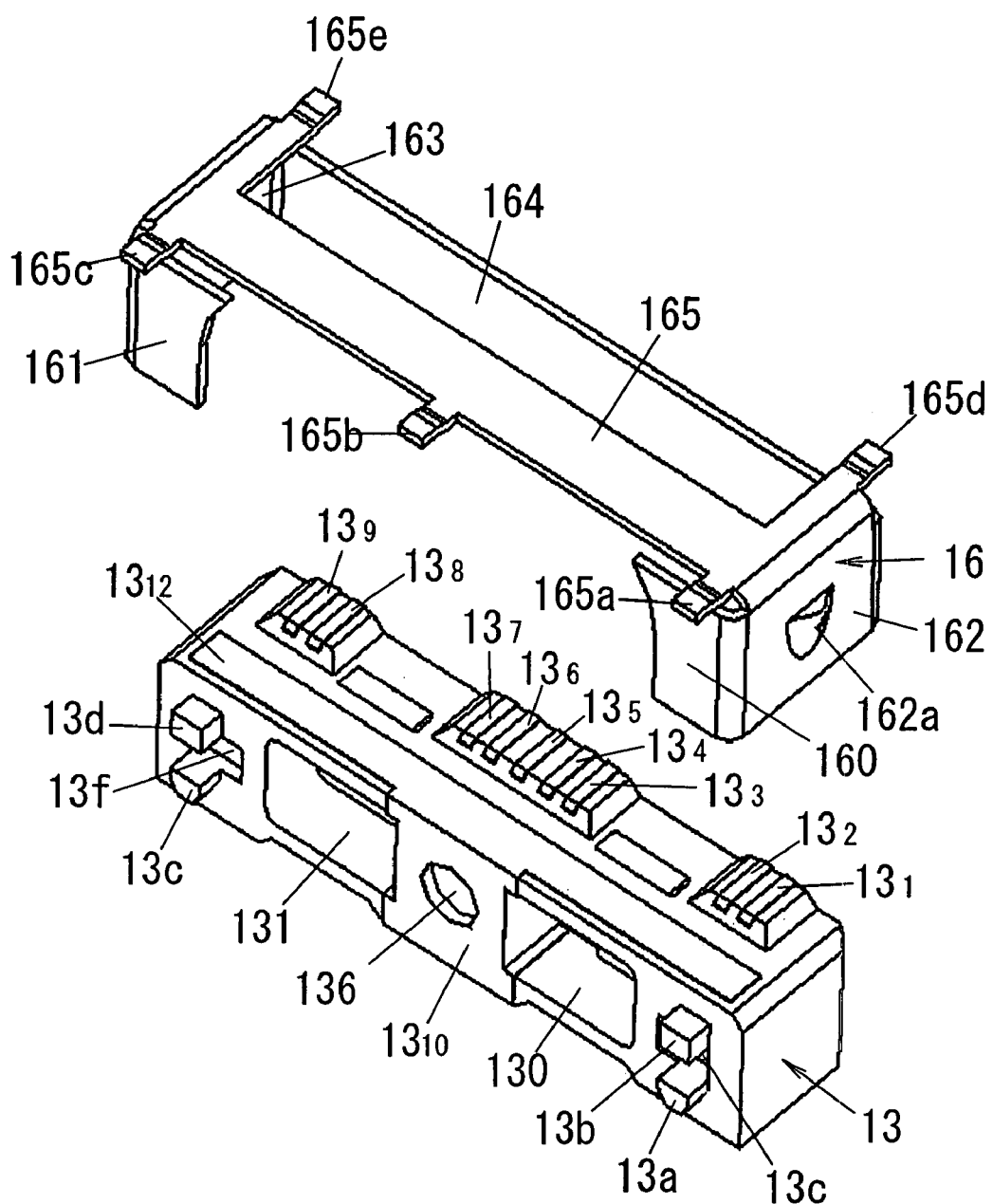
FIG. 11 is a perspective view of a metal case of the plug-socket connector apparatus and the MID.
Figure 12:
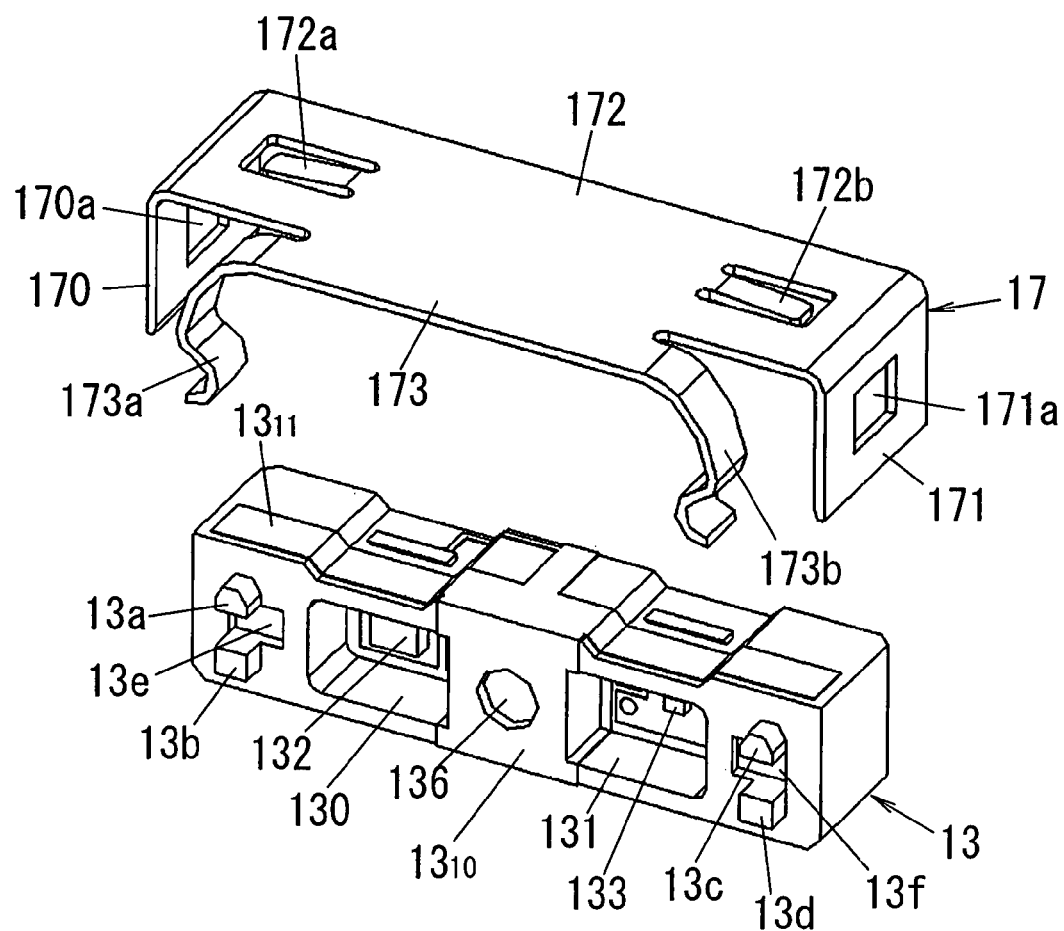
FIG. 12 is a perspective view of a metal cover of the plug-socket connector apparatus and the MID.
Figure 13:
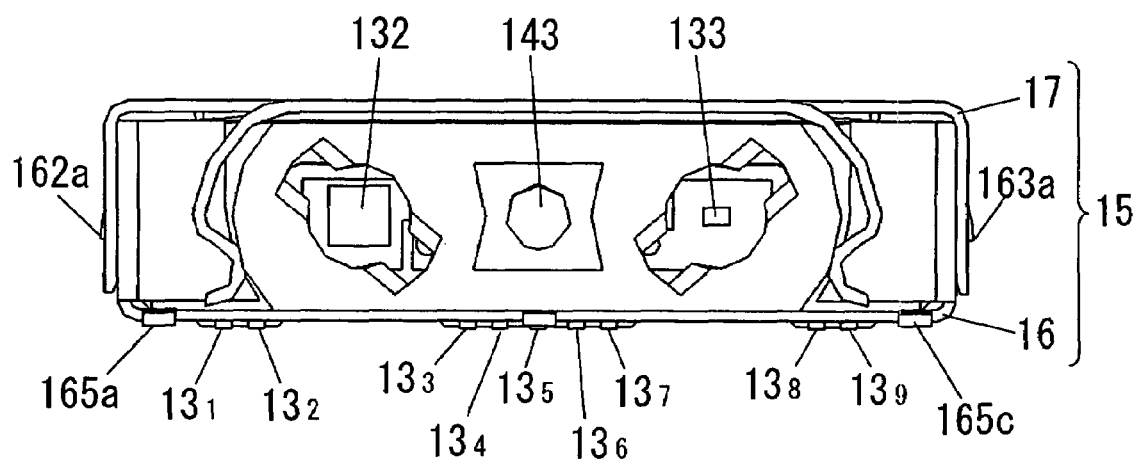
FIG. 13 is a front view of a socket unit of the plug-socket connector apparatus.

The through hole 143 is formed between the bores 141 and 142, and is located in front of the hollow 136 of the MID 13 when the MID 13 and holder 14 are fixed to each other. In addition, as shown in FIGS. 10A and 10B, the hollow 136 is larger than the circular hole of the through hole 143 and accordingly forms a slit gap 136a between the holder 14 and the MID 13 around the abyss of the through hole 143 (the circular hole). When the back face of the holder 14 is in contact with the front face of the MID 13, adhesive is applied to not only each of the hollows 13e and 13f (gaps 13g and 13h) but also the hollow 136 (gap 136a). Afterwards, if the adhesive applied to the hollow 136 hardens, the MID 13 and holder 14 are preferably fixed through the adhesive. In this construction, since adhesive area can be spread to enhance adhesive strength, the MID 13 and holder 14 can be preferably fixed. In short, the socket 12 further comprises the adhesive applied to the hollow 136.

Figure 9A:
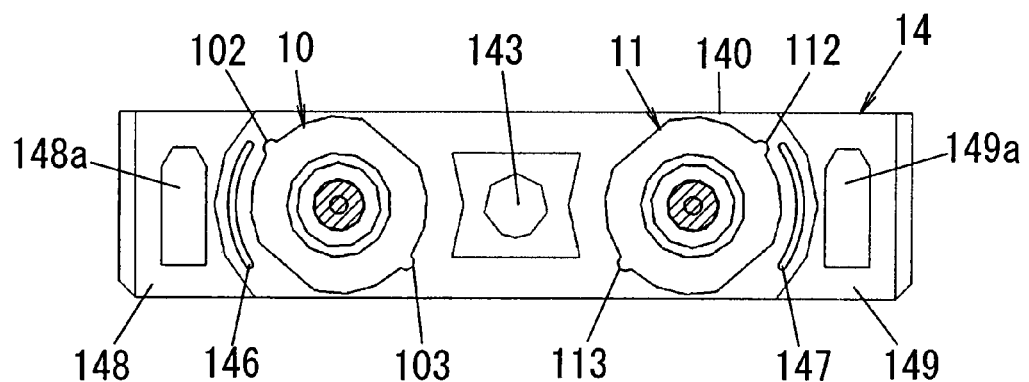
FIGS. 9A and 9B are front and back views of the holder combined with the first and second plugs, respectively.
Figure 9B:
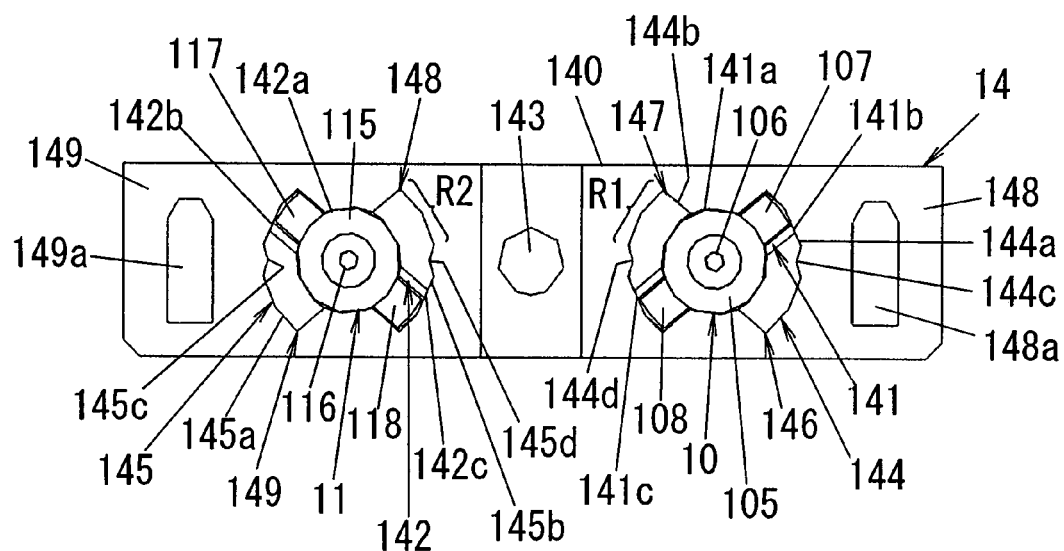

As shown in FIG. 9B, the first retainer 144 is configured to retain the latches 107 and 108 of the first circular plug-tip 105 when the plug-tip 105 is plugged in the first bore 141. In addition, the retainer 144 is configured to prevent the plug-tip 105 from falling out of the bore 141 and to restrict rotation angle of the plug 10 around the first pinhole 106 within a predetermined first rotation angle range R1 larger than each width dimension of the latches 107 and 108. Specifically, the retainer 144 comprises first and second arched hollows 144a and 144b as well as first and second lock ribs 144c and 144d. The hollows 144a and 144b are located in the back of the holder 14, and are formed around an axis of the first circular bore 141a continuously from the backs of the first and second cuts 141b and 141c, respectively. In the example of FIG. 9B, the hollows 144a and 144b are formed in counterclockwise direction around the axis of the bore 141a continuously from the backs of the cuts 141b and 141c, respectively. Accordingly, the bore 141 comes in contact with the side face of the plug-tip 105 so that the plug 10 can rotate around the pinhole 106 when the plug 10 is mechanically connected with the socket 12. The first lock rib 144c is formed on the circumferential face of the hollow 144a between one part including the cut 141b of the hollow 144a and the remaining part of the hollow 144a. The second lock rib 144d is formed on the circumferential face of the hollow 144b between one part including the cut 141c of the hollow 144b and the remaining part of the hollow 144b. Therefore, when the latches 107 and 108 exist in the remaining parts of the hollows 144a and 144b, respectively, the rotation angle of the plug 10 is restricted within the range R1 corresponding to the remaining parts by the ribs 144c and 144d. In addition, the latches 107 and 108 are in contact with the bottoms of the hollows 144a and 144b, respectively, and thereby the plug-tip 105 is prevented from falling out of the bore 141.

Similarly, the second retainer 145 is configured to retain the latches 117 and 118 of the second circular plug-tip 115 when the plug-tip 115 is plugged in the second bore 142. In addition, the retainer 145 is configured to prevent the plug-tip 115 from falling out of the bore 142 and to restrict rotation angle of the plug 11 around the second pinhole 116 within a predetermined second rotation angle range R2 (e.g., R2=R1) larger than each width dimension of the latches 117 and 118. Specifically, the retainer 145 comprises third and fourth arched hollows 145a and 145b as well as third and fourth lock ribs 145c and 145d. The hollows 145a and 145b are located in the back of the holder 14, and are formed around an axis of the second circular bore 142a continuously from the backs of the third and fourth cuts 142b and 142c, respectively. In the example of FIG. 9B, the hollows 145a and 145b are formed in clockwise direction around the axis of the bore 142a continuously from the backs of the cuts 142b and 142c, respectively. Accordingly, the bore 142 comes in contact with the side face of the plug-tip 115 so that the plug 11 can rotate around the pinhole 116 when the plug 11 is mechanically connected with the socket 12. The third lock rib 145c is formed on the circumferential face of the hollow 145a between one part including the cut 142b of the hollow 145a and the remaining part of the hollow 145a. The fourth lock rib 145d is formed on the circumferential face of the hollow 145b between one part including the cut 142c of the hollow 145b and the remaining part of the hollow 145b. Therefore, when the latches 117 and 118 exist in the remaining parts of the hollows 145a and 145b, respectively, the rotation angle of the plug 11 is restricted within the range R2 corresponding to the remaining parts by the ribs 145c and 145d. In addition, the latches 117 and 118 are in contact with the bottoms of the hollows 145a and 145b, respectively, and thereby the plug-tip 115 is prevented from falling out of the bore 142. Thus, in case that the rotation directions of the plugs 10 and 11 are opposite directions to each other, it is possible to prevent, for example, twist of each of the cables 18 and 19 between a pair of the plug-socket connector apparatus. For example, when the sockets 12 and 12 are mirror-arranged so that the holders 14 and 14 face to each other, rotation directions at both ends of each of the cables 18 and 19 between the holders 14 and 14 agree between the holders. In an alternate embodiment, the hollows 144a and 144b are formed in clockwise direction around the axis of the bore 141a, and the hollows 145a and 145b are formed in counterclockwise direction around the axis of the bore 142a.

As shown in FIG. 9A, the holder 14 is further provided with a first mark 146 for representing a rotation range of one of the first ribs 102 and 103 as well as a second mark 147 for representing a rotation range of one of the second ribs 112 and 113. Each of the marks 146 and 147 is formed of print, rib or the like. In this case, since a rotation angle of each of the plugs 10 and 11 is understood, the connection working efficiency is improved.

The socket 12 is assembled by inserting the first twin projections 13a and 13b and the second twin projections 13c and 13d of the MID 13 into the first and second retaining holes 148a and 149a of the holder 14, respectively to apply adhesive to each of the hollow 136 and the first and second hollows 13e and 13f. In this case, the projections 13a and 13c and the projections 13b and 13d are in the shapes of U- and square-shapes, respectively and the retaining holes 148a and 149a are in the shapes corresponding to the projections 13*a* and 13*b* and the projections 13*c* and 13*d*, respectively, and therefore false insertion of the twin projections into the retaining holes is prevented.

As shown in FIGS. 1, 11, 12 and 13, the metal shell 15 comprises a metal case 16 and a metal cover 17. The case 16 has front sides 160 and 161, left and right sides 162 and 163, a rear side 164, and a base 165. The front sides 160 and 161 cover the flanges 148 and 149 of the holder 14, respectively. The left and right sides 162 and 163 have lock nails 162*a* and 163*a* and covers the left and right sides of the socket 12, respectively. The rear side 164 covers the rear side of the socket 12. The base 165 has earth tabs 165*a*-165*e*, and covers one part of the bottom of the socket 12 to be in contact with the earth pattern $13_{12}$ electrically connected with the shield pattern $13_{10}$ and opens the terminals $13_1$-$13_9$ in the remaining part. The base 165 also intervenes between the MID 13 and a printed circuit board when the socket 12 is mounted on the board. In this point, the terminals $13_1$-$13_9$ are electrically connected with lands of the board, respectively and each of the tabs 165*a*-165*e* is soldered to a ground pattern of the board. Especially, the tab 165*b* is located right under the shield pattern $13_{10}$ and is soldered to the ground pattern and accordingly shield effect of the pattern $13_{10}$ can be enhanced. Consequently, electrical separation between optical elements 132 and 133 can be performed certainly.

The cover 17 has left and right sides 170 and 171, a top 172 and an attachment 173. The left and right sides 170 and 171 have holes 170*a* and 171*a* locked and held at the lock nails 162*a* and 163*a* and cover the left and right sides 162 and 163, respectively. Accordingly, the cover 17 is electrically connected with the case 16. The top 172 has spring pieces 172*a* and 172*b* that elastically contacts the earth pattern $13_{11}$ of the MID 13, and covers the top of the socket 12. The spring pieces 172*a* and 172*b* also press the earth pattern $13_{12}$ of the MID 13 against the base 165 of the case 16. Accordingly, shield performance of the metal shell 15 can be further enhanced. The attachment 173 is joined to the front edge of the top 172 and has a pair of spring pieces 173*a* and 173*b*. These are formed to pinch the body 140 of the holder 14 between the pieces from the upper of the body 140. Therefore, the conductive holder 14 is electrically connected with the cover 17 when the body 140 is pinched between the spring pieces 173*a* and 173*b*. As a result, radiation noise caused by high speed transmission can be reduced and EMI can be improved.

The metal shell 15 incorporates with the socket 12 by putting the socket 12 in the case 16 and then covering the case 16 with the cover 17 to make the body 140 intervene between the spring pieces 173*a* and 173*b* of the attachment 173 and also to lock the lock nails 162*a* and 163*a* of the case 16 to the holes 170*a* and 171*a* of the cover 17, respectively. In this case, it is possible to shield almost the whole socket 12 except the region of the terminals $13_1$-$13_9$ as well as the bores 141 and 142 respectively corresponding to the small plugs 10 and 11. Moreover, when the plugs 10 and 11 are plugged in the bores 141 and 142, the bores 141 and 142 are also shielded with the plugs 10 and 11.

Figure 14A:
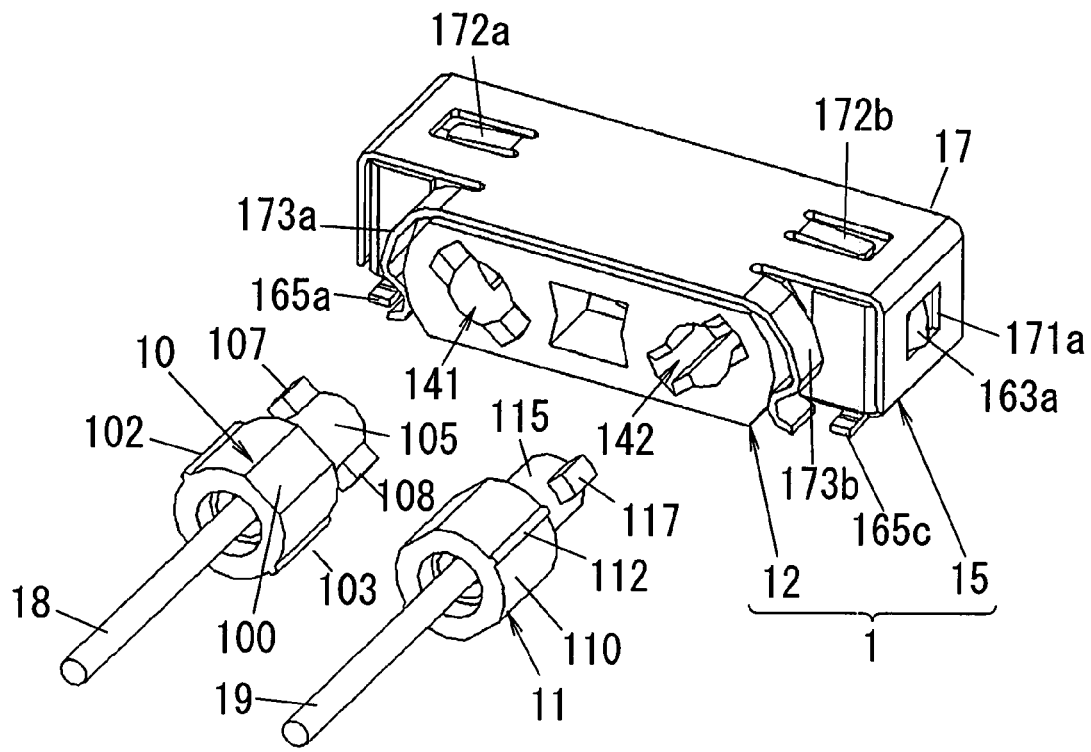
FIGS. 14A and 14B are explanatory diagrams of connection of the first and second plugs to the socket unit.
Figure 14B:
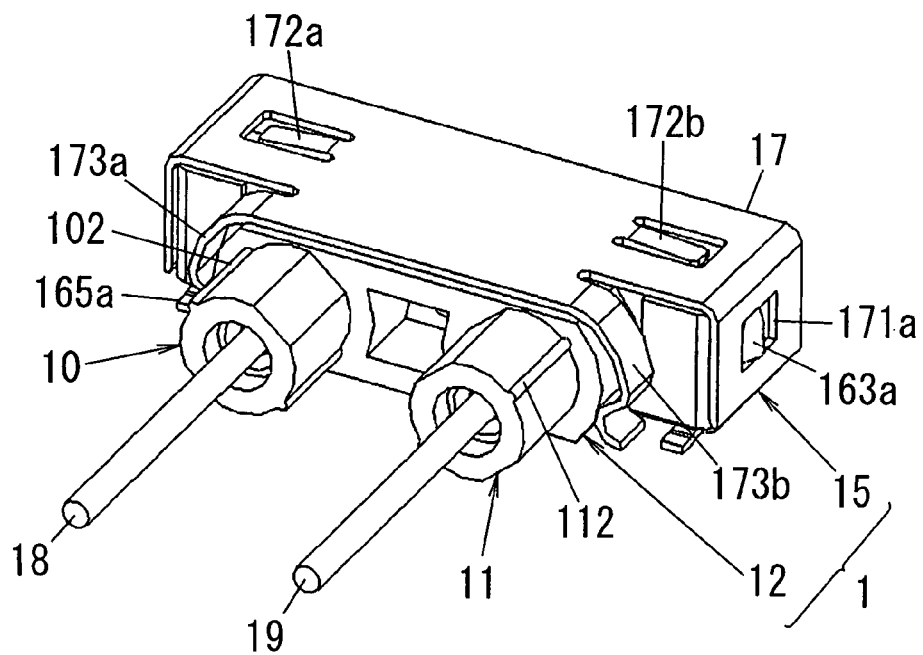

That is, as shown in FIGS. 14A and 14B, a socket unit 1 in which the socket 12 is incorporated in the metal shell 15 is obtained. This unit 1 is mounted on a printed circuit board so that the terminal $13_1$-$13_9$ of the socket 12 are soldered onto lands of the board, respectively. The earth tabs 165*a*-165*e* are then soldered onto ground patterns of the board, respectively. Afterwards, the plug 10 is inserted into the bore 141 and rotated counterclockwise. At this point, the latches 107 and 108 of the plug 10 respectively pass over the lock ribs 144*c* and 144*d* to be locked within the range R1, and the plug 10 is retained by the retainer 144. On the other hands, the plug 11 is inserted into the bore 142 and rotated clockwise. At this point, the latches 117 and 118 of the plug 11 respectively pass over the lock ribs 145*c* and 145*d* to be locked within the range R2, and the plug 11 is retained by the retainer 145. By the way, the plugs 10 and 11 can be detached from the unit 1 by rotating the plugs 10 and 11 clockwise and counterclockwise, respectively.

Figure 15A:
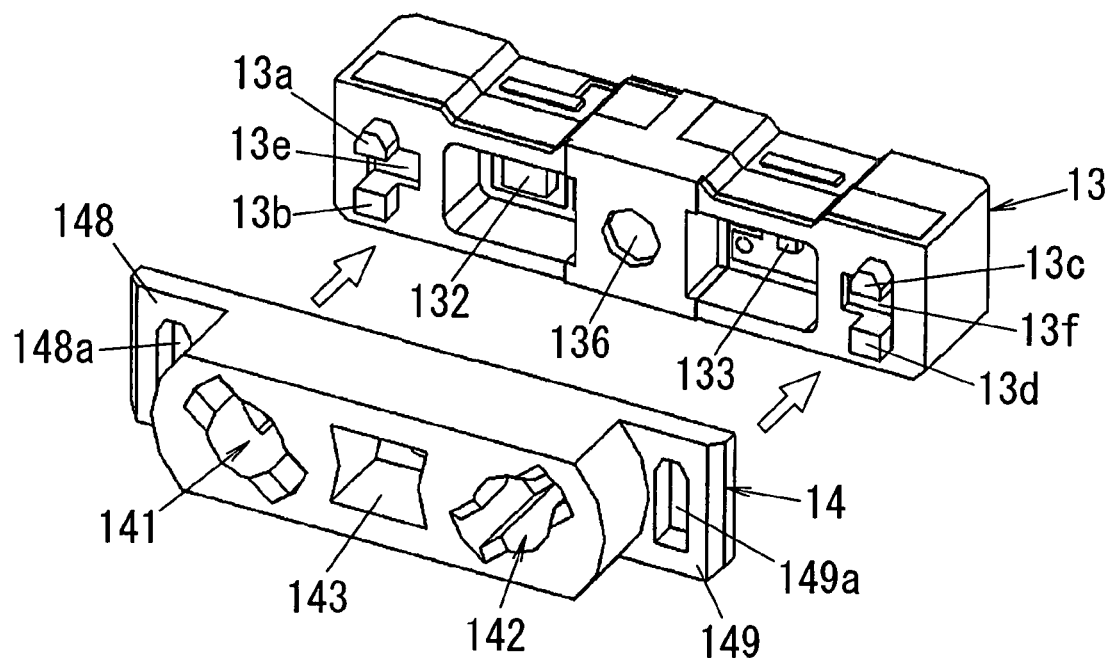
FIGS. 15A-15C is an explanatory diagram of production method of the connector apparatus.
Figure 15B:
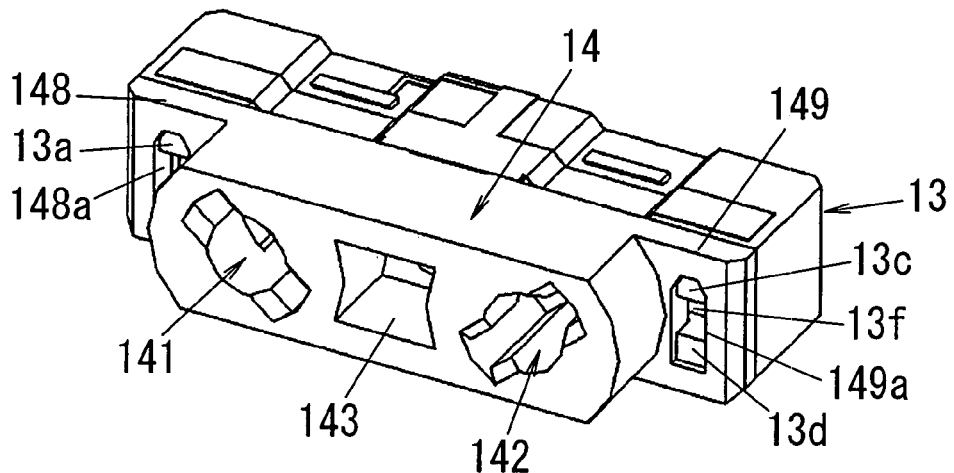
Figure 15C:
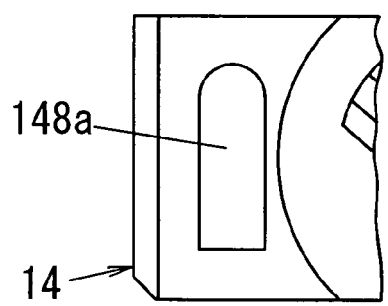

The production method of the connector apparatus is explained with reference to FIGS. 15A-15C. In the state that the positions of the first twin projections 13*a* and 13*b* and second twin projections 13*c* and 13*d* of the MID 13 as well as the first retaining hole 148*a* and the second retaining hole 149*a* of the holder 14 are matched, the holder 14 is approached to the MID 13 and then the back surface of the holder 14 is contacted with the front surface of the MID 13 (see FIG. 15B). At this point, the first twin projections 13*a* and 13*b* and second twin projections 13*c* and 13*d* are respectively inserted into the first retaining hole 148*a* and the second retaining hole 149*a* to be fit, and thereby the MID 13 and the holder 14 are positioned relatively. In addition, the projections 13*a* and 13*c* and the projections 13*b* and 13*d* are in the shapes of U- and square-shapes, respectively and the retaining holes 148*a* and 149*a* are in the shapes corresponding to the projections 13*a* and 13*b* and the projections 13*c* and 13*d*, respectively, and therefore false insertion of the twin projections into the retaining holes is prevented.

And in the state that the back surface of the holder 14 is contacted with the front surface of the MID 13, adhesive is filled into the hollow 13*e* between the twin projections 13*a* and 13*b*, the hollow 13*f* between the twin projections 13*c* and 13*d*, and the cavity of through hole 143, and then hardened. Thereby, the MID 13 and holder 14 are coupled through the adhesive. Herein, a fit projection inserted into the retaining hole 148*a* of the flange 148 is divided into the twin projections 13*a* and 13*b*. A fit projection inserted into the retaining hole 149*a* of the flange 149 is divided into the twin projections 13*c* and 13*d*. The hollow 13*e* between the twin projections 13*a* and 13*b* is deep in depth and is formed wider than the twin projections 13*a* and 13*b*. The hollow 13*f* between the twin projections 13*c* and 13*d* is deep in depth and is formed wider than the twin projections 13*c* and 13*d*. Accordingly, injection quantity of the adhesive is increased and thereby the adhesive strength can be heightened, and also there is an advantage that impletion of the adhesive becomes easy. The part corresponding to the circular hole of the through hole 143 of the holder 14 in the front of the MID 13 is also provided with the circular hollow 136 (a hole for injecting adhesive) larger in diameter (i.e., opening area) than the circular hole. Accordingly, adhesive filled into the cavity of the through hole 143 is filled into the hollow 136 through the circular hole. Herein, as shown in FIGS. 10A and 10B, the circular hole of the through hole 143 is set to be smaller in diameter (i.e., opening area) than the hollow 136. Accordingly, a part of the adhesive filled into the cavity of the through hole 143 is attached to the circumferential part of the circular hole in the back of the holder 14 and thereby adhesion area of the adhesive can be increased to enhance adhesion strength between the MID 13 and holder 14.

Afterwards, in the state that the holder 14 side of the socket 12 is positioned in front side, the socket 12 is put in the case 16 from upside. The case 16 is then covered with the cover 17 to make the body 140 intervene between the spring pieces 173*a* and 173*b* of the attachment 173 and also to lock the lock nails 162*a* and 163*a* of the case 16 to the holes 170*a* and 171*a* of the cover 17, respectively. Thereby, the metal shell 15 incorporates with the socket 12.

In the embodiment, each of the plugs 10 and 11 is a single ferrule plug, and accordingly, for example, upper and lower cases constituting a conventional plug can be omitted. Since the terminals $13_1$-$13_9$ are located on the bottom face of the socket 12 (MID 13) and the bores 141 and 142 are located at the front side of the socket 12, it is possible to reduce thickness dimension of an electronic product equipped with the plug-socket connector apparatus of the invention in comparison with the plug-socket connector apparatus obtained from said hybrid optical-electrical connector apparatus. Moreover, since the plugs 10 and 11 can rotate within the ranges R1 and R2 around the pinholes 106 and 116, it is possible to absorb stress from the optical fiber cables 18 and 19 while retaining the cables 18 and 19 to prevent optical axes of the optical fibers 181 and 191 from deviating from optical axes of the optical elements 132 and 133. For example, even if the plug 10 rotates within the range R1 in response to stress from the cable 18, the plug 10 rotates around the pinhole 106 and therefore the optical axis of the optical fiber 181 is constant.

Figure 16:
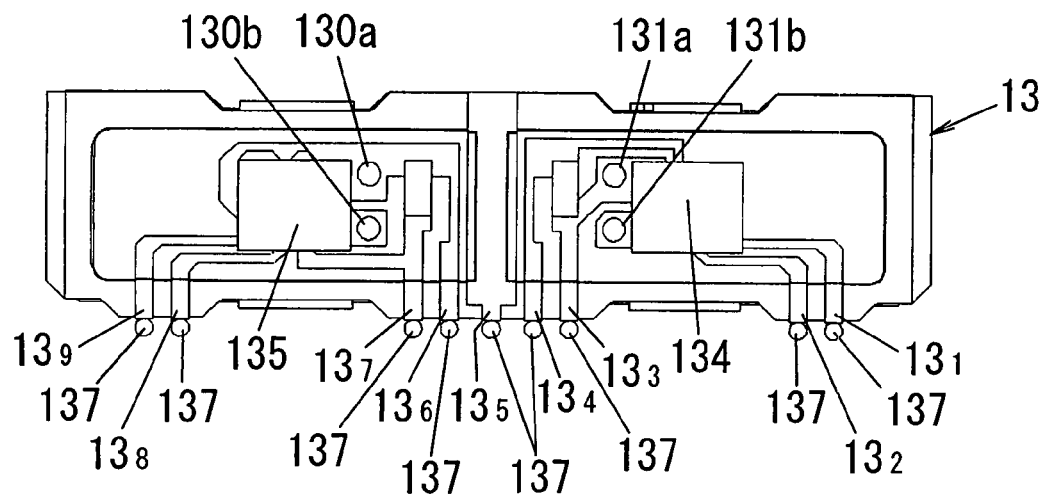
FIG. 16 illustrates a modified embodiment.

In a modified embodiment, as shown in FIG. 16, each of the terminals $13_1$-$13_9$ is provided with a soldering ball 137. In this case, flatness can be improved and the terminals $13_1$-$13_9$ can be certainly soldered onto lands of a printed circuit board.

Figure 17:
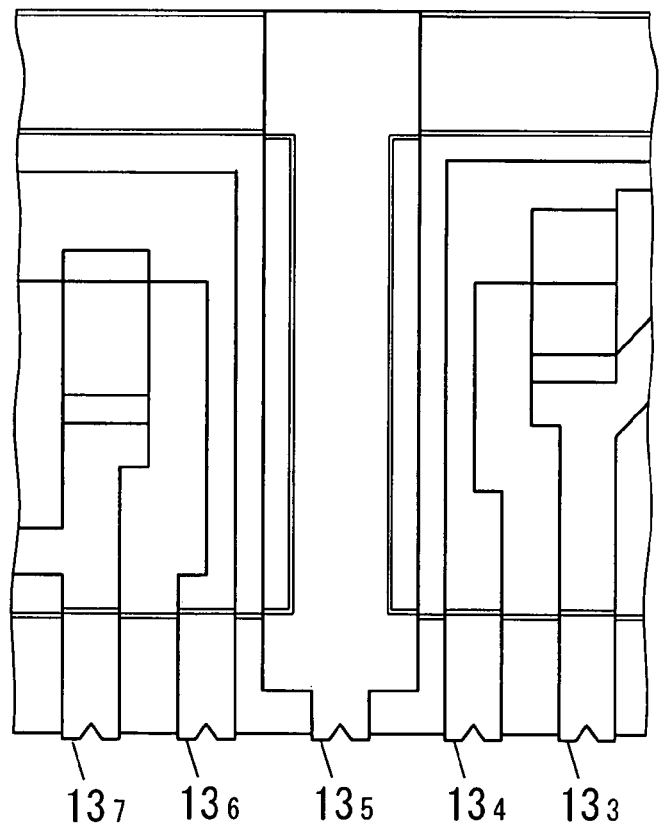
FIG. 17 illustrates a modified embodiment.

In a modified embodiment, as shown in FIG. 17, each of the terminals $13_1$-$13_9$ is formed into a V-shape in section. In this case, since an area of each of the terminals $13_1$-$13_9$ is spread, soldering strength can be enhanced.

In a modified embodiment, each of the first and second plugs 10 and 11 and the plug holder 14 is made of insulating synthetic resin and is plated with conductive material. Also, in this case, it is possible to shield almost the whole socket 12 except the region of the terminals $13_1$-$13_9$ as well as the bores 141 and 142 respectively corresponding to the small plugs 10 and 11.

Figure 18:
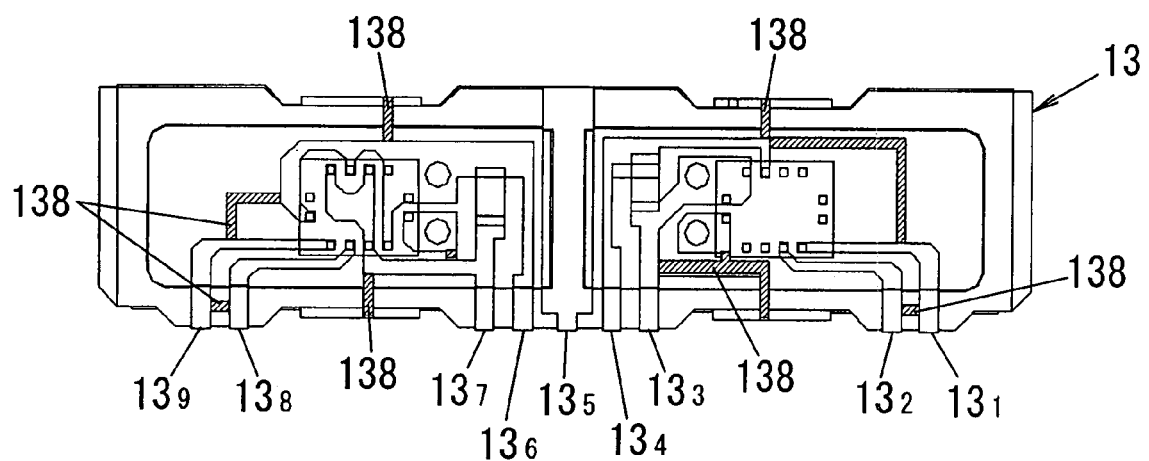
FIG. 18 illustrates a modified embodiment.
Figure 19A:
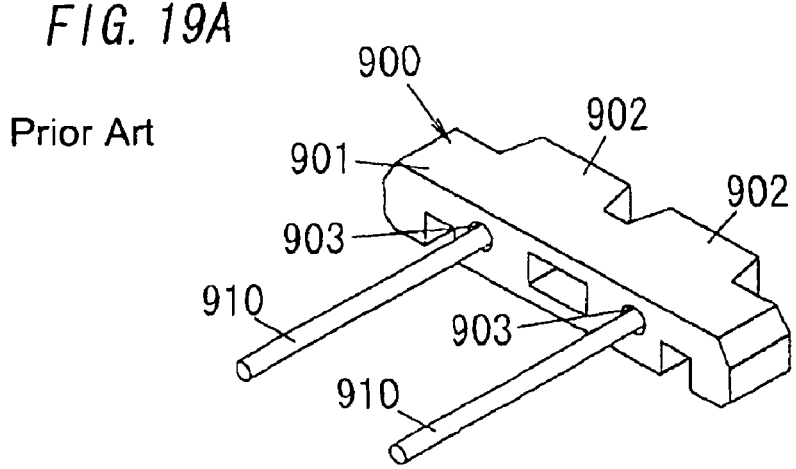
FIGS. 19A and 19B illustrate a photoelectric conversion connector which has been proposed conventionally.
Figure 19A:
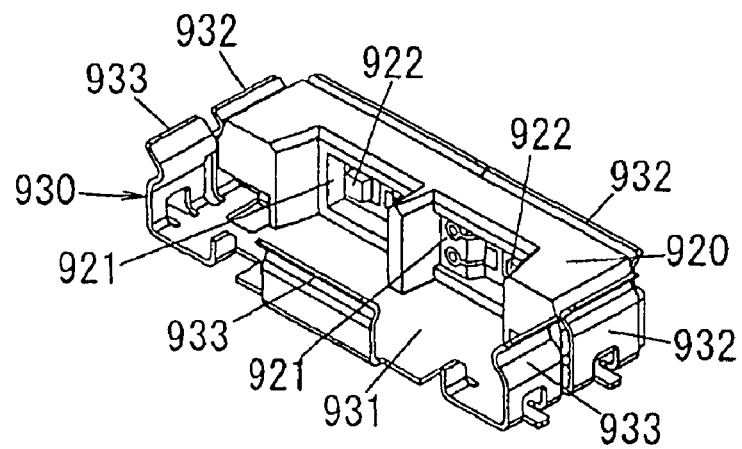
Figure 19B:
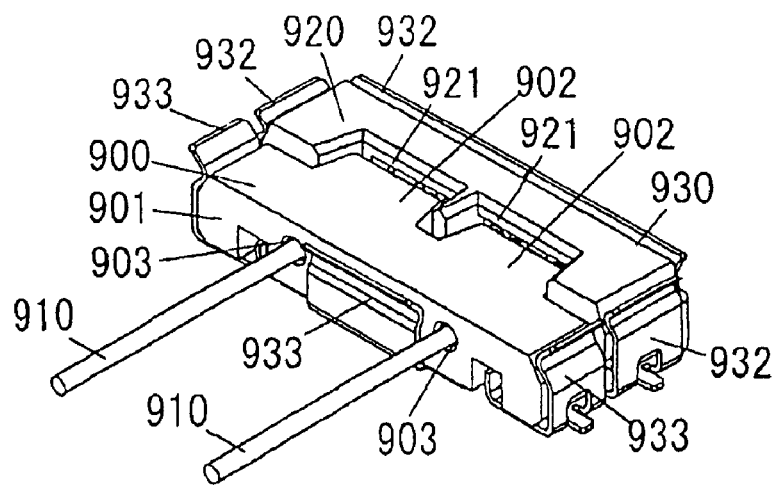

In a modified embodiment, in case that conductive patterns of the MID 13 are formed through electroplating, surplus power supply patterns (138) of the conductive patterns in MID 13 are cut as shown in FIG. 18. Thus, by cutting surplus power supply patterns to remove the surplus power supply patterns, noise can be reduced.

In a varied embodiment, the plug-socket connector apparatus for optical fiber termination comprises a plug and a socket. The plug is a single ferrule plug and comprises a plug-base, a circular plug-tip and at least one latch. The plug-base has a hole into which one end of an optical fiber cable is inserted, and fixes the end inserted into the hole. The circular plug-tip has a pinhole into which an optical fiber projected from the end of the optical fiber cable is inserted. The at least one latch is formed on one part of the side face of the plug-tip. The socket comprises a cavity, a photoelectric converter, terminals, a bore and a retainer. The bottom of the cavity faces the end face of the optical fiber projected form the end of the cable when the socket is mechanically connected with the plug. The converter includes an optical element located on the bottom of the cavity. The terminals are located on the bottom face of the socket and are electrically connected with the converter. The terminals are also electrically connected with lands of a printed circuit board, respectively when the socket is mounted on the board. The bore is located at one side of the socket, and comes in contact with the remaining part of the side face of the plug-tip so that the plug can rotate around the pinhole when the plug is mechanically connected with the socket. When the plug-tip is plugged in the bore, the retainer retains said at least one latch so as to prevent the plug-tip from falling out of the bore and to restrict a rotation angle of the plug around the pinhole within a predetermined rotation angle range. For example, the plug can be configured in the same way as the first and second plugs 10 and 11. The socket can be configured by any one of a light receiving socket and a light emitting socket, obtained by dividing the MID 13 and the plug holder 14. In this case, the hollow 136, the through hole 143 and the shield pattern $13_{10}$ are omitted, and also one of the terminals $13_1$-$13_5$ and the terminals $13_5$ and $13_9$ are omitted. The socket of this varied embodiment may be incorporated in a metal shell like the embodiment of FIG. 1.

Although the present invention has been described with reference to certain preferred embodiments, numerous modifications and variations can be made by those skilled in the art without departing from the true spirit and scope of this invention.

The invention claimed is:

1. Plug-socket connector apparatus for optical fiber termination, comprising:
   a plug fixed at one end of an optical fiber cable enclosing an optical fiber;
   a socket configured to be mechanically connected with the plug, said socket having a cavity of which bottom faces the end face of the optical fiber projected from the end of the optical fiber cable when mechanically connected with the plug; and
   a photoelectric converter including an optical element located on the bottom of the cavity, said converter being provided for the socket;
   wherein the plug is a single ferrule plug comprising:
   a plug-base having a hole into which the end of the optical fiber cable is inserted, said plug-base fixing the end inserted into the hole;
   a circular plug-tip having a pinhole into which the optical fiber projected from the end of the optical fiber cable is inserted; and
   at least one latch formed on one part of the side face of the plug-tip;
   wherein the socket further comprises:
   terminals that are located on the bottom face of the socket and are electrically connected with the converter, said terminals being electrically connected with lands of a printed circuit board, respectively when the socket is mounted on the board;
   a bore located at one side of the socket, said bore coming in contact with the remaining part of the side face of the plug-tip so that the plug can rotate around the pinhole when the plug is mechanically connected with the socket; and
   a retainer that retains said at least one latch so as to prevent the plug-tip from falling out of the bore and to restrict a rotation angle of the plug around the pinhole within a predetermined rotation angle range, when the plug-tip is plugged in the bore.

2. Plug-socket connector apparatus for optical fiber termination, comprising:
   first and second plugs fixed at one ends of first and second optical fiber cables enclosing first and second optical fibers, respectively;
   a socket configured to be mechanically connected with the first and second plugs, said socket having first and second cavities of which bottoms face the end faces of the first and second optical fibers projected from the ends of the first and second optical fiber cables, respectively when mechanically connected with the first and second plugs; and
   first and second photoelectric converters including first and second optical elements located on the bottoms of the first and second cavities, respectively, said first and second photoelectric converters being provided for the socket, wherein the first and second plugs are both single ferrule plugs and respectively comprising:

first and second plug-bases having first and second holes into which the ends of the first and second optical fiber cables are inserted, respectively, said first and second plug-bases fixing the ends inserted into the first and second holes, respectively;

first and second circular plug-tips having first and second pinholes into which the first and second optical fibers projected from the ends of the first and second optical fiber cables are inserted, respectively; and at least one latch formed on one part of the side face of the first circular plug-tip and at least one latch formed on one part of the side face of the second circular plug-tip;

wherein the socket further comprises:

terminals that are located on the bottom face of the socket and are electrically connected with the first and second photoelectric converters, said terminals being electrically connected with lands of a printed circuit board, respectively when the socket is mounted on the board;

first and second bores located at one side of the socket, said first and second bores coming in contact with the remaining parts of the side faces of the first and second circular plug-tips so that the first and second plugs can rotate around the first and second pinholes, respectively when the first and second plugs are mechanically connected with the socket; and first and second retainers that retain the latches of the first and second circular plug-tips so as to prevent the first and second circular plug-tips from falling out of the first and second bores and to restrict rotation angles of the first and second plugs around the first and second pinholes within predetermined first and second rotation angle ranges, when the first and second circular plug-tips are plugged in the first and second bores, respectively.

3. The apparatus of claim 1, further comprising a metal shell;

wherein: the socket is formed of a molded interconnect device having the cavity, the photoelectric converter and the terminals, and a plug holder having the bore and the retainer, said holder being fixed to the molded interconnect device so that the bore is located in front of the cavity; and the metal shell substantially covers the whole socket except at least a region of the terminals as well as the holder.

4. The apparatus of claim 2, further comprising a metal shell;

wherein the socket is formed of a molded interconnect device having the first and second cavities, the first and second photoelectric converters and the terminals, and a plug holder having the first and second bores and the first and second retainers, said holder being fixed to the molded interconnect device so that the first and second bores are located in front of the first and second cavities, respectively; and the metal shell substantially covers the whole socket except at least a region of the terminals as well as the holder.

5. The apparatus of claim 3, wherein:

the plug has first and second latches as the at least one latch, said first and second latches sticking out from opposite sides of the side face of the plug-tip; and the bore comprises a circular bore corresponding to the plug-tip and first and second cuts respectively corresponding to the first and second latches;

wherein the retainer comprises:

first and second arched hollows located in the back of the plug holder, said first and second arched hollows being formed around an axis of the circular bore continuously from the backs of the first and second cuts, respectively, a first lock rib being formed on the circumferential face of the first arched hollow between one part including the first cut of the first arched hollow and the remaining part of the first arched hollow; and a second lock rib being formed on the circumferential face of the second arched hollow between one part including the second cut of the second arched hollow and the remaining part of the second arched hollow;

each of the remaining parts of the first and second arched hollows corresponding to said predetermined rotation angle range.

6. The apparatus of claim 4, wherein:

the first plug has first and second latches as the at least one latch, said first and second latches sticking out from opposite sides of the side face of the first circular plug-tip;

the second plug has third and fourth latches as the at least one latch, said third and fourth latches sticking out from opposite sides of the side face of the second circular plug-tip;

the first bore comprises a first circular bore corresponding to the first circular plug-tip and first and second cuts respectively corresponding to the first and second latches; and the second bore comprises a second circular bore corresponding to the second circular plug-tip and third and fourth cuts respectively corresponding to the third and fourth latches;

wherein the first retainer comprises:

first and second arched hollows located in the back of the plug holder, said first and second arched hollows being formed around an axis of the first circular bore continuously from the backs of the first and second cuts, respectively;

a first lock rib being formed on the circumferential face of the first arched hollow between one part including the first cut of the first arched hollow and the remaining part of the first arched hollow; and a second lock rib being formed on the circumferential face of the second arched hollow between one part including the second cut of the second arched hollow and the remaining part of the second arched hollow;

wherein the second retainer comprises:

third and fourth arched hollows located in the back of the plug holder, said third and fourth arched hollows being formed around an axis of the second circular bore continuously from the backs of the third and fourth cuts, respectively;

a third lock rib being formed on the circumferential face of the third arched hollow between one part including the third cut of the third arched hollow and the remaining part of the third arched hollow; and a fourth lock rib being formed on the circumferential face of the fourth arched hollow between one part including the fourth cut of the fourth arched hollow and the remaining part of the fourth arched hollow;

wherein: each of the remaining parts of the first and second arched hollows correspond to the first rotation angle range; and each of the remaining parts of the third and fourth arched hollows correspond to the second rotation angle range.

7. The apparatus of claim 4, wherein: the plug holder is made of conductive material; and the metal shell has at least one spring piece that elastically contacts the plug holder.

8. The apparatus of claim 7, wherein each of the first and second plugs is made of conductive material.

9. The apparatus of claim 8, wherein:
one and the other of the first and second optical elements are a light emitting element and a light receiving element, respectively;
the molded interconnect device has a shield pattern that is located on a partition wall between the first and second cavities and is electrically connected with the metal shell; and
the metal shell has a base intervening between the molded interconnect device and the printed circuit board, the base being provided with an earth tab that is located right under the shield pattern and is soldered to a ground pattern of the printed circuit board.

10. The apparatus of claim 9, wherein:
the top of the molded interconnect device is formed with an earth pattern electrically connected with the shield pattern; and
the metal shell further has at least one spring piece that elastically contacts the earth pattern.

11. The apparatus of claim 4,
wherein the plug holder further comprises first and second retaining holes outside the first and second bores, respectively;
wherein the molded interconnect device further comprises:
first and second twin projections respectively inserted into the first and second retaining holes to be retained;
first and second hollows that are respectively formed between the first twin projections and between the second twin projections, said first and second hollows respectively forming first and second gaps between the plug holder and the molded interconnect device; and
wherein the socket further comprises adhesive applied to each of the first and second hollows.

12. The apparatus of claim 4, wherein:
the plug holder further comprises a through hole formed between the first and second bores;
the molded interconnect device further comprises a hollow that is larger than the through hole and forms a slit gap between the plug holder and the molded interconnect device around the abyss of the through hole; and
the socket further comprises adhesive applied to the hollow.

13. The apparatus of claim 6, wherein the first and second arched hollows are formed around the axis of the first circular bore in opposite directions to each other continuously from the backs of the first and second cuts, respectively.

14. The apparatus of claim 4, wherein
the side faces of the first and second plug-bases are provided with first and second ribs for indicating rotation angles, respectively; and
the plug holder has first and second marks for representing rotation ranges of the first and second ribs, respectively.

* * * * *